(12) United States Patent
Luick

(10) Patent No.: US 7,945,763 B2
(45) Date of Patent: *May 17, 2011

(54) SINGLE SHARED INSTRUCTION PREDECODER FOR SUPPORTING MULTIPLE PROCESSORS

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 11/610,110

(22) Filed: Dec. 13, 2006

(65) Prior Publication Data

US 2008/0148089 A1    Jun. 19, 2008

(51) Int. Cl.
*G06F 9/30* (2006.01)
(52) U.S. Cl. ........................................ 712/213
(58) Field of Classification Search ............ 712/213
See application file for complete search history.

(56) References Cited

U.S. PATENT DOCUMENTS

| | | | | | |
|---|---|---|---|---|---|
| 5,922,065 | A | * | 7/1999 | Hull et al. | 712/24 |
| 5,970,235 | A | | 10/1999 | Witt et al. | |
| 6,092,182 | A | * | 7/2000 | Mahalingaiah | 712/213 |
| 6,223,254 | B1 | * | 4/2001 | Soni | 711/125 |
| 6,564,298 | B2 | * | 5/2003 | Jourdan et al. | 711/125 |
| 6,832,305 | B2 | * | 12/2004 | Park et al. | 712/34 |
| 2002/0169942 | A1 | * | 11/2002 | Sugimoto | 712/24 |
| 2002/0199151 | A1 | | 12/2002 | Zuraski, Jr. | |
| 2007/0226464 | A1 | * | 9/2007 | Chaudhry et al. | 712/209 |
| 2007/0288725 | A1 | | 12/2007 | Luick | |
| 2008/0141253 | A1 | | 6/2008 | Luick | |
| 2008/0148020 | A1 | | 6/2008 | Luick | |
| 2008/0148089 | A1 | | 6/2008 | Luick | |
| 2008/0162883 | A1 | | 7/2008 | Luick | |

OTHER PUBLICATIONS

Foldoc.org: "superscalar" definition. Oct. 10, 2003 (Date obtained via http://dictionary.die.net/superscalar).*
Techterms.com: "superscalar" definition. Date Unknown.*
Patterson, David. Hennessy, John. "Computer Architecture: A Quantitative Approach". Morgan Kaufmann Publishers, Inc. Second Edition, 1996. pp. 139-150.*

* cited by examiner

*Primary Examiner* — Robert Fennema
(74) *Attorney, Agent, or Firm* — Patterson & Sheridan LLP

(57) ABSTRACT

Improved techniques for executing instructions in a pipelined manner that may reduce stalls that occur when executing dependent instructions are provided. Stalls may be reduced by utilizing a cascaded arrangement of pipelines with execution units that are delayed with respect to each other. This cascaded delayed arrangement allows dependent instructions to be issued within a common issue group by scheduling them for execution in different pipelines to execute at different times.

20 Claims, 22 Drawing Sheets

SINGLE SHARED INSTRUCTION PREDECODER FOR SUPPORTING MULTIPLE PROCESSORS

CROSS-REFERENCE TO RELATED APPLICATIONS

This application is related to commonly assigned U.S. application Ser. No. 11/610,214, filed herewith.

BACKGROUND OF THE INVENTION

1. Field of the Invention

The present invention generally relates to pipelined processors and, more particularly, to processors utilizing a cascaded arrangement of execution units that are delayed with respect to each other.

2. Description of the Related Art

Computer systems typically contain several integrated circuits (ICs), including one or more processors used to process information in the computer system. Modern processors often process instructions in a pipelined manner, executing each instruction as a series of steps. Each step is typically performed by a different stage (hardware circuit) in the pipeline, with each pipeline stage performing its step on a different instruction in the pipeline in a given clock cycle. As a result, if a pipeline is fully loaded, an instruction is processed each clock cycle, thereby increasing throughput.

As a simple example, a pipeline may include three stages: load (read instruction from memory), execute (execute the instruction), and store (store the results). In a first clock cycle, a first instruction enters the pipeline load stage. In a second clock cycle, the first instruction moves to the execution stage, freeing up the load stage to load a second instruction. In a third clock cycle, the results of executing the first instruction may be stored by the store stage, while the second instruction is executed and a third instruction is loaded.

Unfortunately, due to dependencies inherent in a typical instruction stream, conventional instruction pipelines suffer from stalls (with pipeline stages not executing) while an execution unit to execute one instruction waits for results generated by execution of a previous instruction. As an example, a load instruction may be dependent on a previous instruction (e.g., another load instruction or addition of an offset to a base address) to supply the address of the data to be loaded. As another example, a multiply instruction may rely on the results of one or more previous load instructions for one of its operands. In either case, a conventional instruction pipeline would stall until the results of the previous instruction are available. Stalls can be for several clock cycles, for example, if the previous instruction (on which the subsequent instruction is dependent) targets data that does not reside in an L1 cache (resulting in an L1 "cache miss") and a relatively slow L2 cache must be accessed. As a result, such stalls may result in a substantial reduction in performance due to underutilization of the pipeline.

Accordingly, what is needed is an improved mechanism of pipelining instructions, preferably that reduces stalls.

SUMMARY OF THE INVENTION

Embodiments of the invention provide improved methods and apparatus for pipelined execution of instructions.

One embodiment provides a method of pre-decoding instructions for execution in a multi-core processing environment. The method generally includes receiving a first line of instructions for execution by a first processor core, predecoding the first line of instructions with a shared predecoder, sending the predecoded first line of instructions from the shared predecoder to the first processor core for execution, receiving a second line of instructions for execution by a second processor core, predecoding the second line of instructions with the shared predecoder, and sending the predecoded first line of instructions from the shared predecoder to the second processor core for execution.

One embodiment provides an integrated circuit device. The device generally includes a plurality of processor cores and a shared predecoder configured to fetch instructions lines, predecode the instructions lines, and send the predecoded instruction lines to the processor cores for execution.

One embodiment provides an integrated circuit device. The device generally includes a plurality of cascaded delayed execution pipeline units, each having at least first and second execution pipelines, wherein instructions in a common issue group issued to the execution pipeline unit are executed in the first execution pipeline before the second execution pipeline and a forwarding path for forwarding results generated by executing a first instruction in the first execution pipeline to the second execution pipeline for use in executing a second instruction, wherein at least one of the first and second execution pipelines operates on a floating point operand and shared predecoding and scheduling circuitry configured to receive lines of instructions to be executed by the pipeline units, predecode the instruction lines to form issue groups whereby first and second instructions in each group are scheduled for execution in the first and second execution pipelines of one of the pipeline units.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
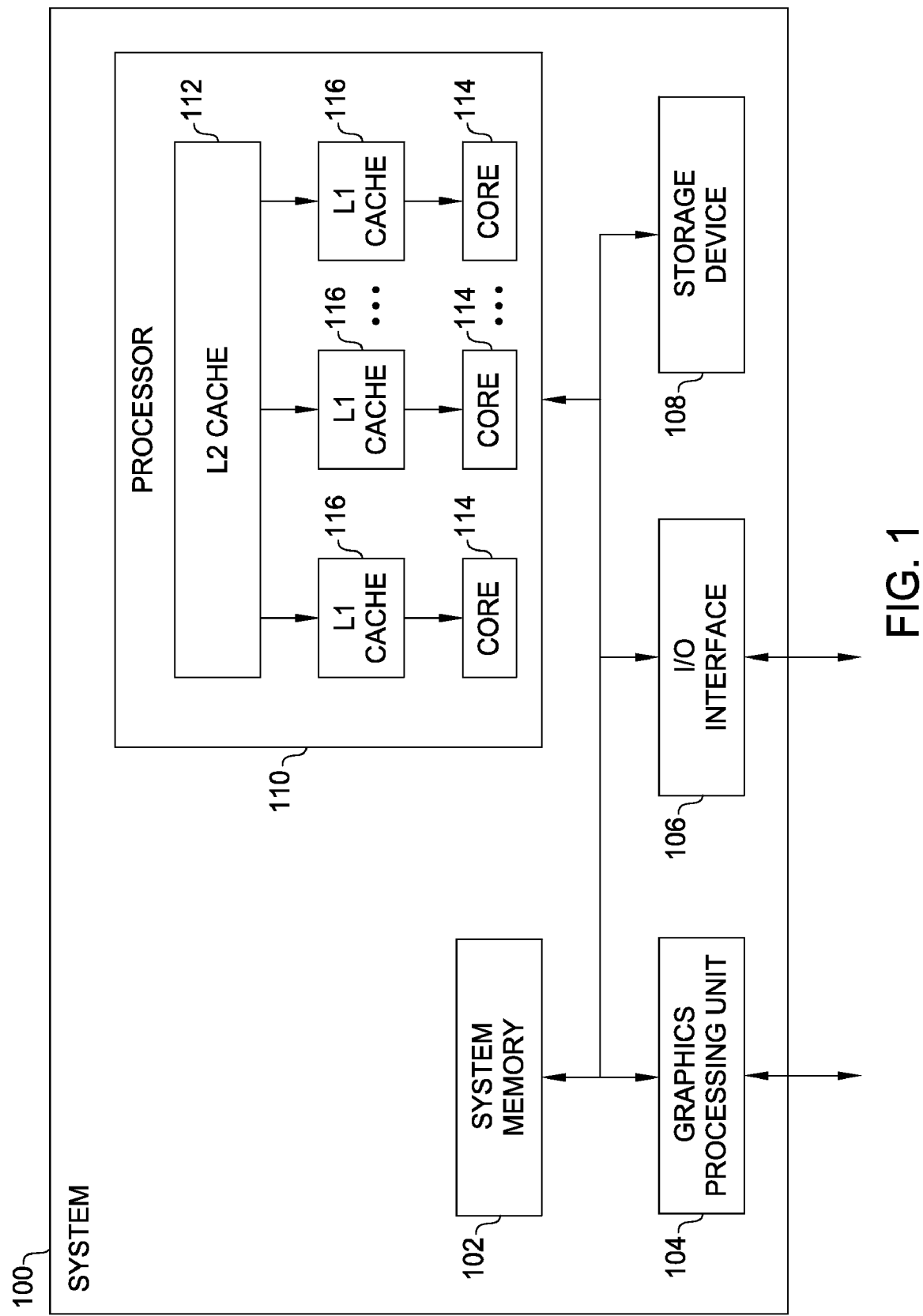
FIG. 1 is a block diagram depicting a system according to one embodiment of the invention.

The present invention generally provides an improved technique for executing instructions in a pipelined manner that may reduce stalls that occur when executing dependent instructions. Stalls may be reduced by utilizing a cascaded arrangement of pipelines with execution units that are delayed with respect to each other. This cascaded delayed arrangement allows dependent instructions to be issued within a common issue group by scheduling them for execution in different pipelines to execute at different times.

As an example, a first instructions may be scheduled to execute on a first "earlier" or "less-delayed" pipeline, while a second instruction (dependent on the results obtained by executing the first instruction) may be scheduled to execute on a second "later" or "more-delayed" pipeline. By scheduling the second instruction to execute in a pipeline that is delayed relative to the first pipeline, the results of the first instruction may be available just in time when the second instruction is to execute. While execution of the second instruction is still delayed until the results of the first instruction are available, subsequent issue groups may enter the cascaded pipeline on the next cycle, thereby increasing throughput. In other words, such delay is only "seen" on a first issue group and is "hidden" for subsequent issue groups, allowing a different issue group (even with dependent instructions) to be issued each pipeline cycle.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

Overview of an Exemplary System

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 (and/or higher levels of cache, such as L3 and/or L4) as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
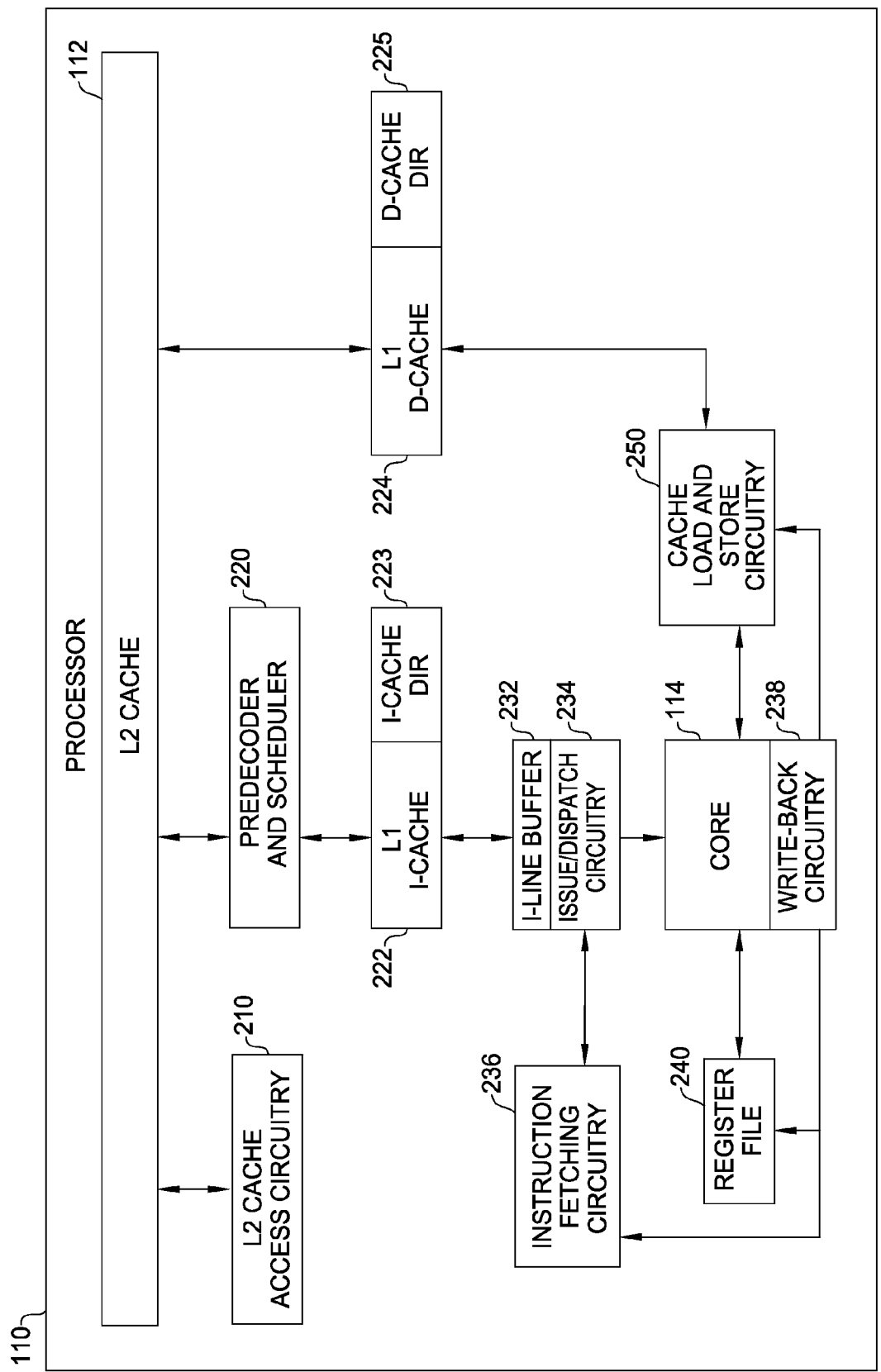
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., containing identical pipelines with the same arrangement of pipeline stages). For other embodiments, cores 114 may be different (e.g., containing different pipelines with different arrangements of pipeline stages).

In one embodiment of the invention, the L2 cache (and/or higher levels of cache, such as L3 and/or L4) may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache. When the processor core 114 requests instructions from the L2 cache 112, the instructions may be first processed by a predecoder and scheduler 220.

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using L2 access circuitry 210.

In one embodiment of the invention, I-lines retrieved from the L2 cache 112 may be processed by a predecoder and scheduler 220 and the I-lines may be placed in the I-cache 222. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution. For some embodiments, the predecoder (and scheduler) 220 may be shared among multiple cores 114 and L1 caches.

In addition to receiving instructions from the issue and dispatch circuitry 234, the core 114 may receive data from a variety of locations. Where the core 114 requires data from a data register, a register file 240 may be used to obtain data. Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) after the D-cache directory 225 is accessed but before the D-cache access is completed.

In some cases, data may be modified in the core 114. Modified data may be written to the register file, or stored in memory. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, as described below, the write-back circuitry 238 may also be used to write instructions back to the I-cache 222.

As described above, the issue and dispatch circuitry 234 may be used to form instruction groups and issue the formed instruction groups to the core 114. The issue and dispatch circuitry 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Cascaded Delayed Execution Pipeline

Figure 3:
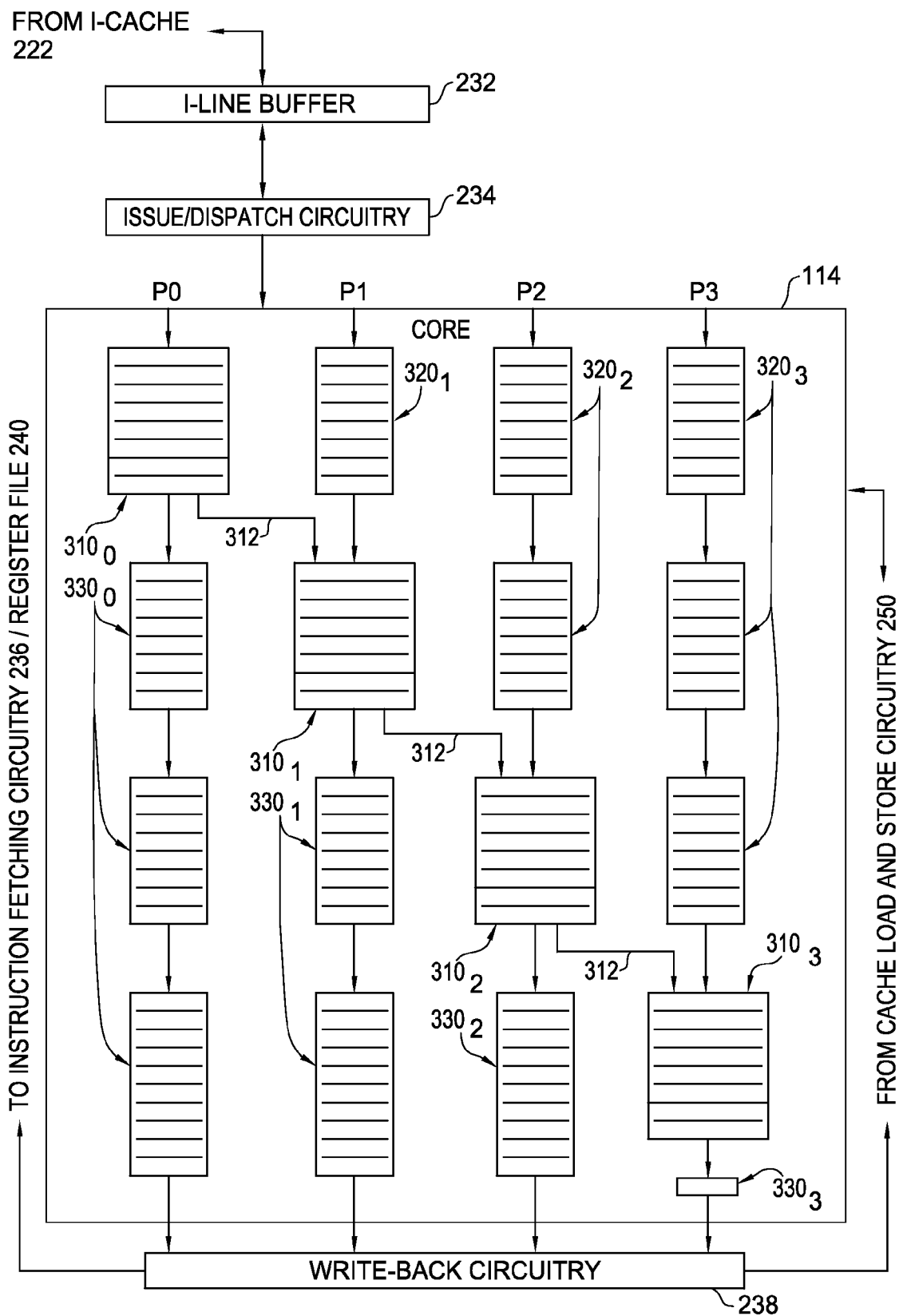
FIG. 3 is a block diagram depicting one of the cores of the processor according to one embodiment of the invention.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, P3) in the cascaded, delayed execution pipeline configuration may contain an execution unit 310. The execution unit 310 may contain several pipeline stages which perform one or more functions for a given pipeline. For example, the execution unit 310 may perform all or a portion of the fetching and decoding of an instruction. The decoding performed by the execution unit may be shared with a predecoder and scheduler 220 which is shared among multiple cores 114 or, optionally, which is utilized by a single core 114. The execution unit may also read data from a register file, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry, as well as any other circuitry, to perform these functions.

In one embodiment, each execution unit 310 may perform the same functions. Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. In such a configuration, where instructions (referred to, for convenience, as I0, I1, I2, I3) in an instruction group are issued in parallel to the pipelines P0, P1, P2, P3, each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on.

In one embodiment, upon issuing the issue group to the processor core 114, I0 may be executed immediately in execution unit $310_0$. Later, after instruction I0 has finished being executed in execution unit $310_0$, execution unit $310_1$ may begin executing instruction I1, and so on, such that the instructions issued in parallel to the core 114 are executed in a delayed manner with respect to each other.

In one embodiment, some execution units 310 may be delayed with respect to each other while other execution units 310 are not delayed with respect to each other. Where execution of a second instruction is dependent on the execution of a first instruction, forwarding paths 312 may be used to forward the result from the first instruction to the second instruction. The depicted forwarding paths 312 are merely exemplary, and the core 114 may contain more forwarding paths from different points in an execution unit 310 to other execution units 310 or to the same execution unit 310.

In one embodiment, instructions which are not being executed by an execution unit 310 (e.g., instructions being delayed) may be held in a delay queue 320 or a target delay queue 330. The delay queues 320 may be used to hold instructions in an instruction group which have not yet been executed by an execution unit 310. For example, while instruction I0 is being executed in execution unit $310_0$, instructions I1, I2, and I3 may be held in a delay queue 330. Once the instructions have moved through the delay queues 330, the instructions may be issued to the appropriate execution unit 310 and executed. The target delay queues 330 may be used to hold the results of instructions which have already been executed by an execution unit 310. In some cases, results in the target delay queues 330 may be forwarded to executions units 310 for processing or invalidated where appropriate. Similarly, in some circumstances, instructions in the delay queue 320 may be invalidated, as described below.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 238 may be used to write back the most recently modified value of a register (received from one of the target delay queues 330) and discard invalidated results.

Performance of Cascaded Delayed Execution Pipelines

Figure 4A:
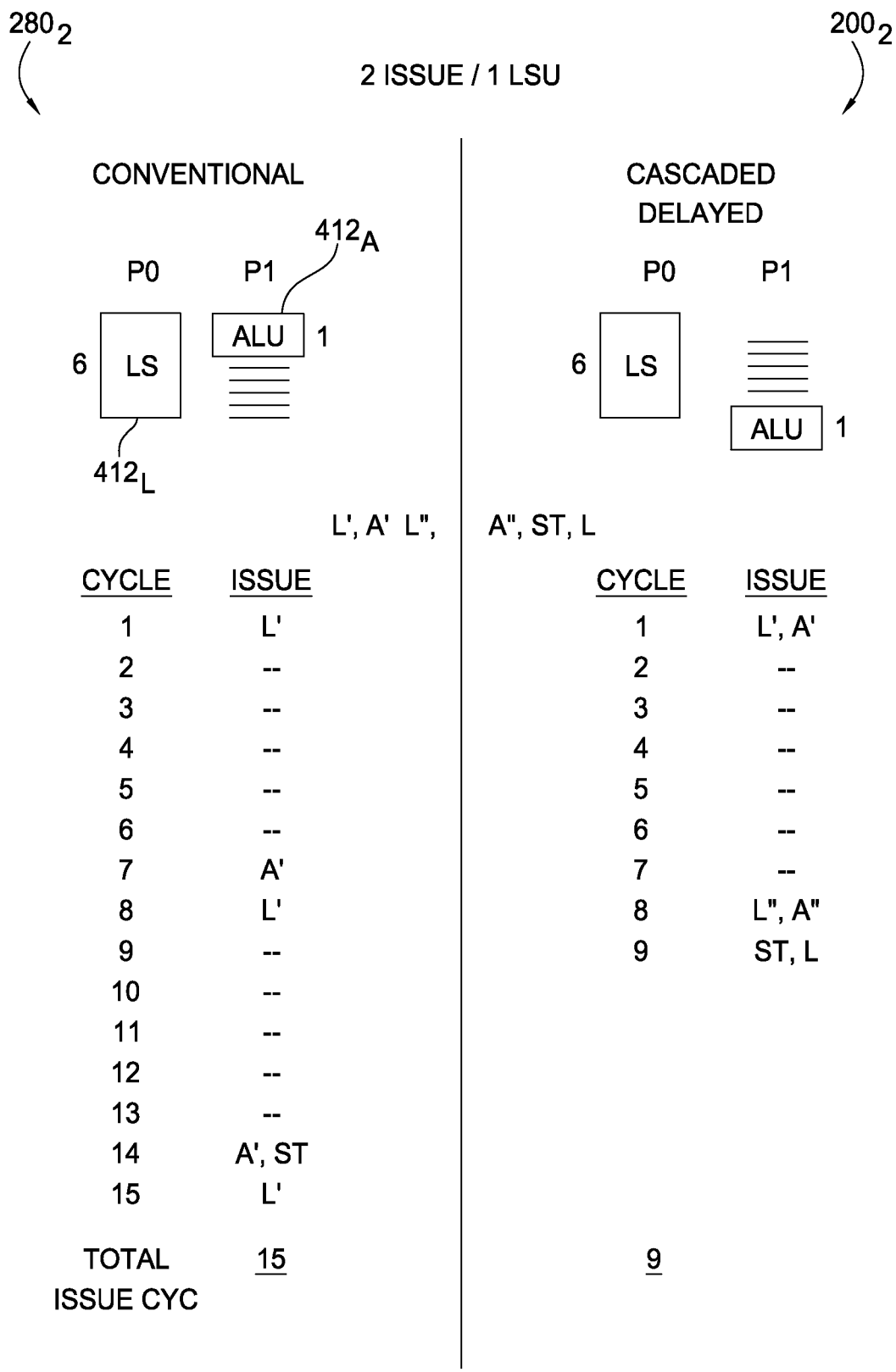
FIGS. 4A and 4B compare the performance of conventional pipeline units to pipeline units in accordance with embodiments of the present invention.
Figure 4B:
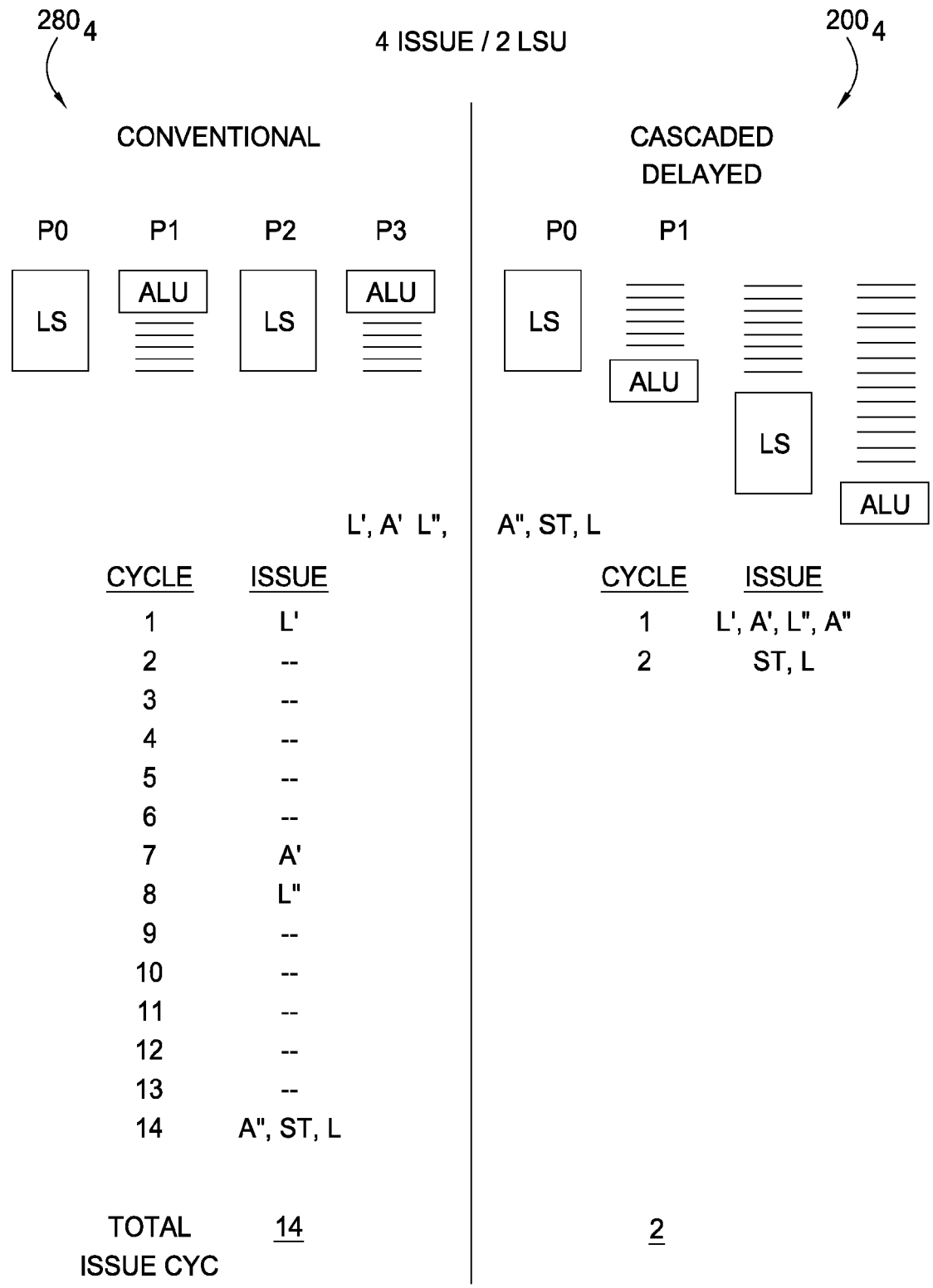

The performance impact of cascaded delayed execution pipelines may be illustrated by way of comparisons with conventional in-order execution pipelines, as shown in FIGS. 4A and 4B. In FIG. 4A, the performance of a conventional "2 issue" pipeline arrangement $280_2$ is compared with a cascaded-delayed pipeline arrangement $200_2$, in accordance with embodiments of the present invention. In FIG. 4B, the performance of a conventional "4 issue" pipeline arrangement $280_4$ is compared with a cascaded-delayed pipeline arrangement $200_4$, in accordance with embodiments of the present invention.

For illustrative purposes only, relatively simple arrangements including only load store units (LSUs) 412 and arithmetic logic units (ALUs) 414 are shown. However, those skilled in the art will appreciate that similar improvements in performance may be gained using cascaded delayed arrangements of various other types of execution units. Further, the performance of each arrangement will be discussed with respect to execution of an exemplary instruction issue group (L'-A'-L"-A"-ST-L) that includes two dependent load-add instruction pairs (L'-A' and L"-A"), an independent store instruction (ST), and an independent load instruction (L). In this example, not only is each add dependent on the previous load, but the second load (L") is dependent on the results of the first add (A').

Referring first to the conventional 2-issue pipeline arrangement $280_2$ shown in FIG. 4A, the first load (L') is issued in the first cycle. Because the first add (A') is dependent on the results of the first load, the first add cannot issue until the results are available, at cycle 7 in this example. Assuming the first add completes in one cycle, the second load (L"), dependent on its results, can issue in the next cycle. Again, the second add (A") cannot issue until the results of the second load are available, at cycle 14 in this example. Because the store instruction is independent, it may issue in the same cycle. Further, because the third load instruction (L) is independent, it may issue in the next cycle (cycle 15), for a total of 15 issue cycles.

Referring next to the 2-issue delayed execution pipeline $200_2$ shown in FIG. 4A, the total number of issue cycles may be significantly reduced. As illustrated, due to the delayed arrangement, with an arithmetic logic unit (ALU) $412_A$ of the second pipeline (P1) located deep in the pipeline relative to a load store unit (LSU) $412_L$ of the first pipeline (P0), both the first load and add instructions (L'-A') may be issued together, despite the dependency. In other words, by the time A' reaches ALU $412_A$, the results of the L' may be available and forwarded for use in execution of A', at cycle 7. Again assuming A' completes in one cycle, L" and A" can issue in the next cycle. Because the following store and load instructions are independent, they may issue in the next cycle. Thus, even without increasing the issue width, a cascaded delayed execution pipeline $200_2$ reduces the total number of issue cycles to 9.

Referring next to the conventional 4-issue pipeline arrangement $280_4$ shown in FIG. 4B, it can be seen that, despite the increase (×2) in issue width, the first add (A') still cannot issue until the results of the first load (L') are available, at cycle 7. After the results of the second load (L") are available, however, the increase in issue width does allow the second add (A") and the independent store and load instructions (ST and L) to be issued in the same cycle. However, this results in only marginal performance increase, reducing the total number of issue cycles to 14.

Referring next to the 4-issue cascaded delayed execution pipeline $200_4$ shown in FIG. 4B, the total number of issue cycles may be significantly reduced when combining a wider issue group with a cascaded delayed arrangement. As illustrated, due to the delayed arrangement, with a second arithmetic logic unit (ALU) $412_A$ of the fourth pipeline (P3) located deep in the pipeline relative to a second load store unit (LSU) $412_L$ of the third pipeline (P2), both load add pairs (L'-A' and L"-A") may be issued together, despite the dependency. In other words, by the time L" reaches LSU 412L of the third pipeline (P2), the results of A' will be available and by the time A" reaches ALU $412_A$ of the fourth pipeline (P3), the results of A" will be available. As a result, the subsequent store and load instructions may issue in the next cycle, reducing the total number of issue cycles to 2.

Scheduling Instructions in an Issue Group

Figure 5:
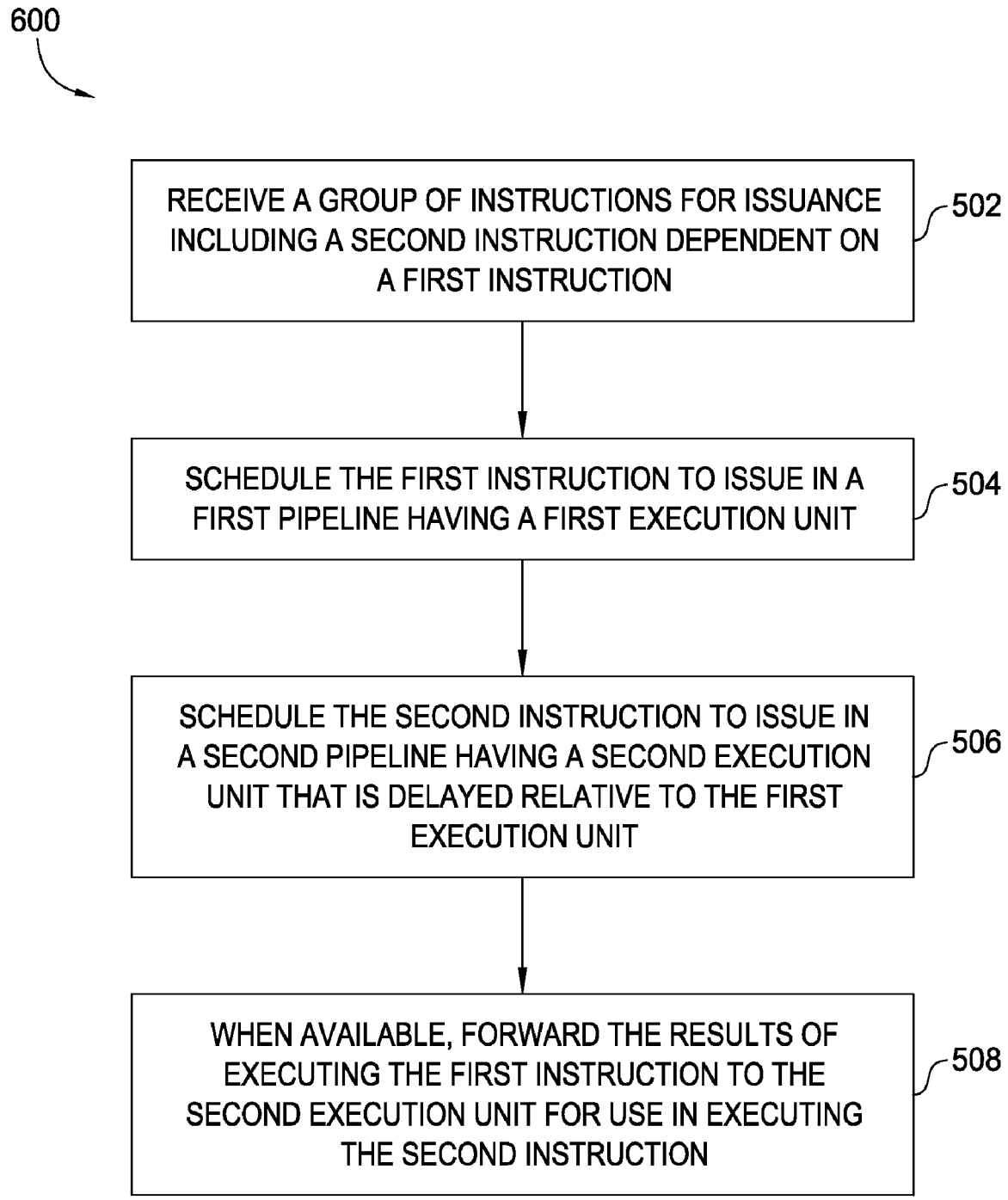
FIG. 5 illustrates an exemplary integer cascaded delayed execution pipeline unit in accordance with embodiments of the present invention.

FIG. 5 illustrates exemplary operations 500 for scheduling and issuing instructions with at least some dependencies for execution in a cascaded-delayed execution pipeline. For some embodiments, the actual scheduling operations may be performed in a predecoder/scheduler circuit shared between multiple processor cores (each having a cascaded-delayed execution pipeline unit), while dispatching/issuing instructions may be performed by separate circuitry within a processor core. As an example, a shared predecoder/scheduler may apply a set of scheduling rules by examining a "window" of instructions to issue to check for dependencies and generate a set of "issue flags" that control how (to which pipelines) dispatch circuitry will issue instructions within a group.

In any case, at step 502, a group of instructions to be issued is received, with the group including a second instruction dependent on a first instruction. At step 504, the first instruction is scheduled to issue in a first pipeline having a first execution unit. At step 506, the second instruction is scheduled to issue in a second pipeline having a second execution unit that is delayed relative to the first execution unit. At step 508 (during execution), the results of executing the first instruction are forwarded to the second execution unit for use in executing the second instruction.

The exact manner in which instructions are scheduled to different pipelines may vary with different embodiments and may depend, at least in part, on the exact configuration of the corresponding cascaded-delayed pipeline unit. As an example, a wider issue pipeline unit may allow more instructions to be issued in parallel and offer more choices for scheduling, while a deeper pipeline unit may allow more dependent instructions to be issued together.

Of course, the overall increase in performance gained by utilizing a cascaded-delayed pipeline arrangement will depend on a number of factors. As an example, wider issue width (more pipelines) cascaded arrangements may allow larger issue groups and, in general, more dependent instructions to be issued together. Due to practical limitations, such as power or space costs, however, it may be desirable to limit the issue width of a pipeline unit to a manageable number. For some embodiments, a cascaded arrangement of 4-6 pipelines may provide good performance at an acceptable cost. The overall width may also depend on the type of instructions that are anticipated, which will likely determine the particular execution units in the arrangement.

An Example Embodiment of an Integer Cascaded Delayed Execution Pipeline

Figure 6:
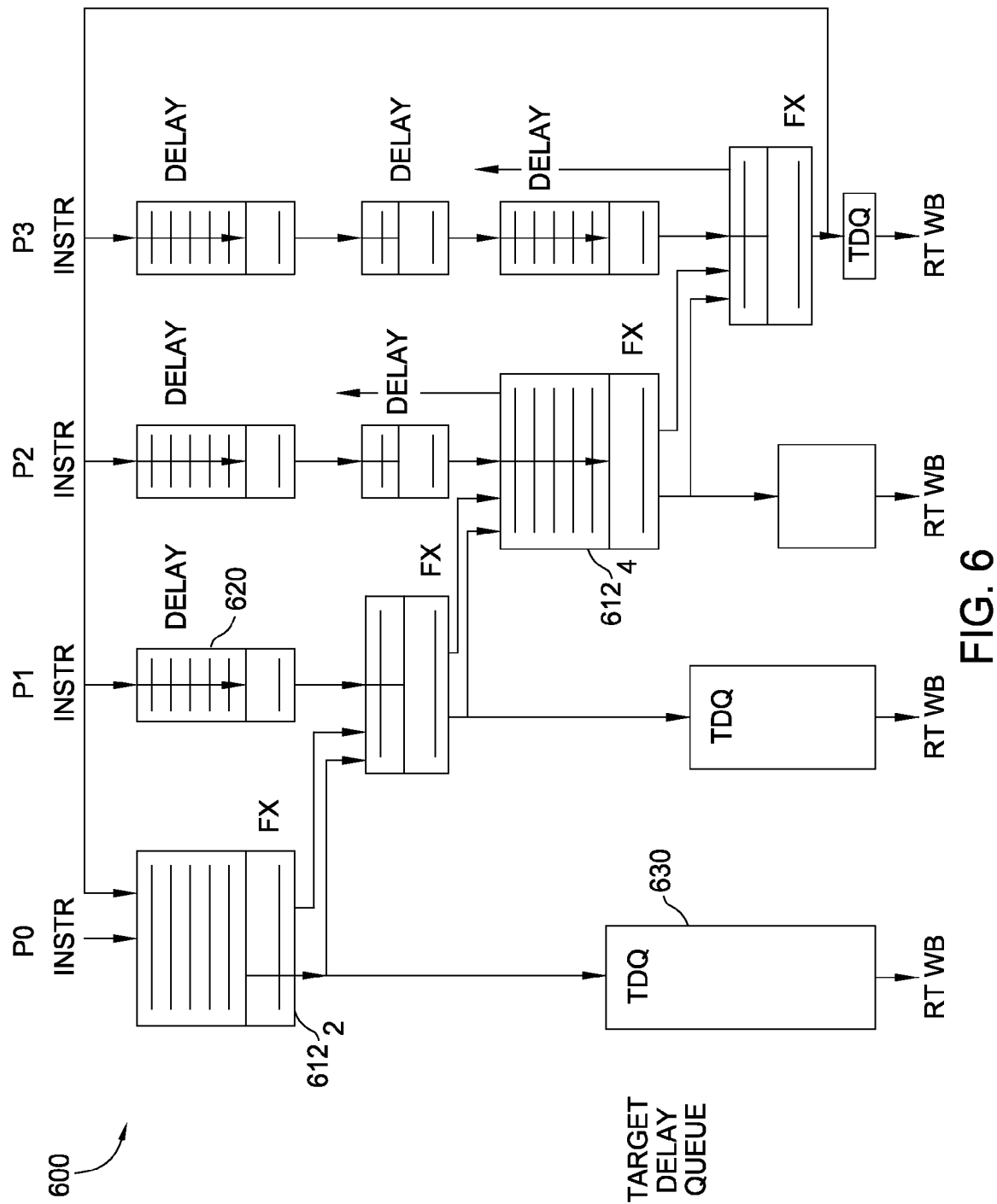
FIG. 6 is a flow diagram of exemplary operations for scheduling and issuing instructions in accordance with embodiments of the present invention.

FIG. 6 illustrates an exemplary arrangement of a cascaded-delayed execution pipeline unit 600 for executing integer instructions. As illustrated, the unit has four execution units, including two LSUs $612_L$ and two ALUs $614_A$. The unit 600 allows direct forwarding of results between adjacent pipelines. For some embodiments, more complex forwarding may be allowed, for example, with direct forwarding between non-adjacent pipelines. For some embodiments, selective forwarding from the target delay queues (TDQs) 630 may also be permitted.

FIGS. 7A-7D illustrate the flow of an exemplary issue group of four instructions (L'-A'-L"-A") through the pipeline unit 600 shown in FIG. 6. As illustrated, in FIG. 7A, the issue group may enter the unit 600, with the first load instruction (L') scheduled to the least delayed first pipeline (P0). As a result, L' will reach the first LSU 612L to be executed before the other instructions in the group (these other instructions may make there way down through instruction queues 620) as L' is being executed.

Figure 7A:
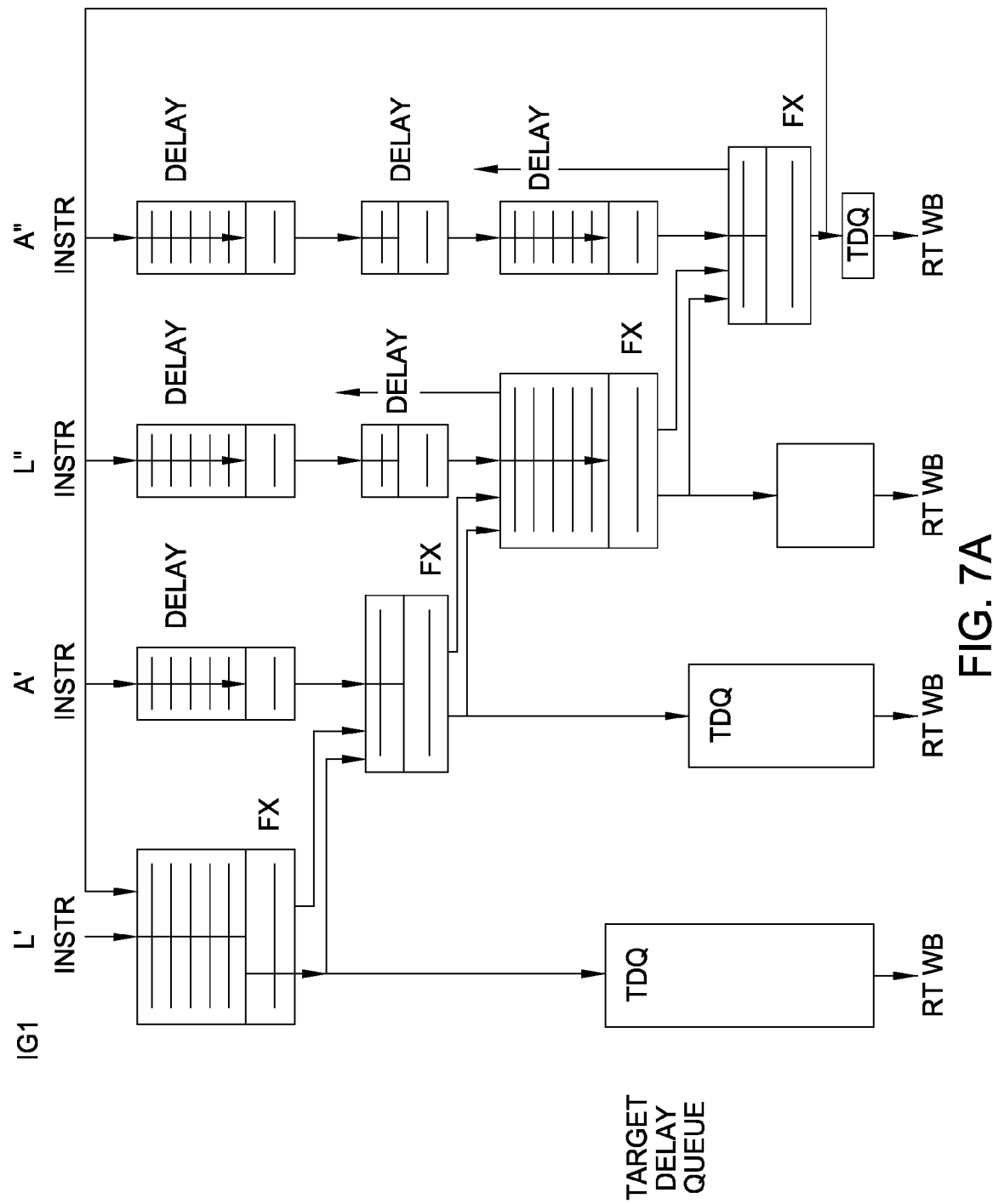
FIGS. 7A-7D illustrate the flow of instructions through the pipeline unit shown in FIG. 5.
Figure 7B:
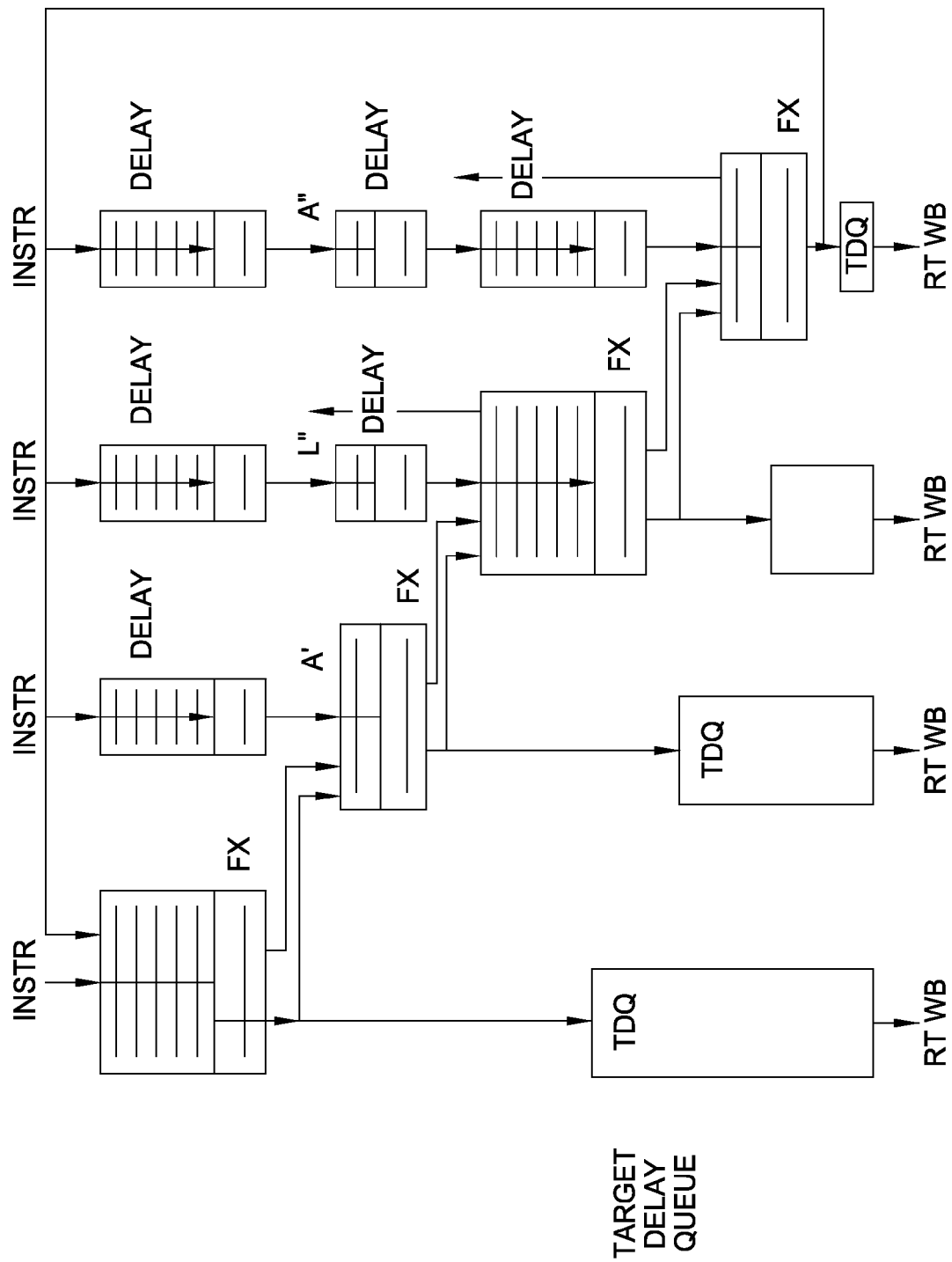

As illustrated in FIG. 7B, the results of executing the first load (L') may be available (just in time) as the first add A' reaches the first ALU 612A of the second pipeline (P1). In some cases, the second load may be dependent on the results of the first add instruction, for example, which may calculate by adding an offset (e.g., loaded with the first load L') to a base address (e.g., an operand of the first add A').

Figure 7C:
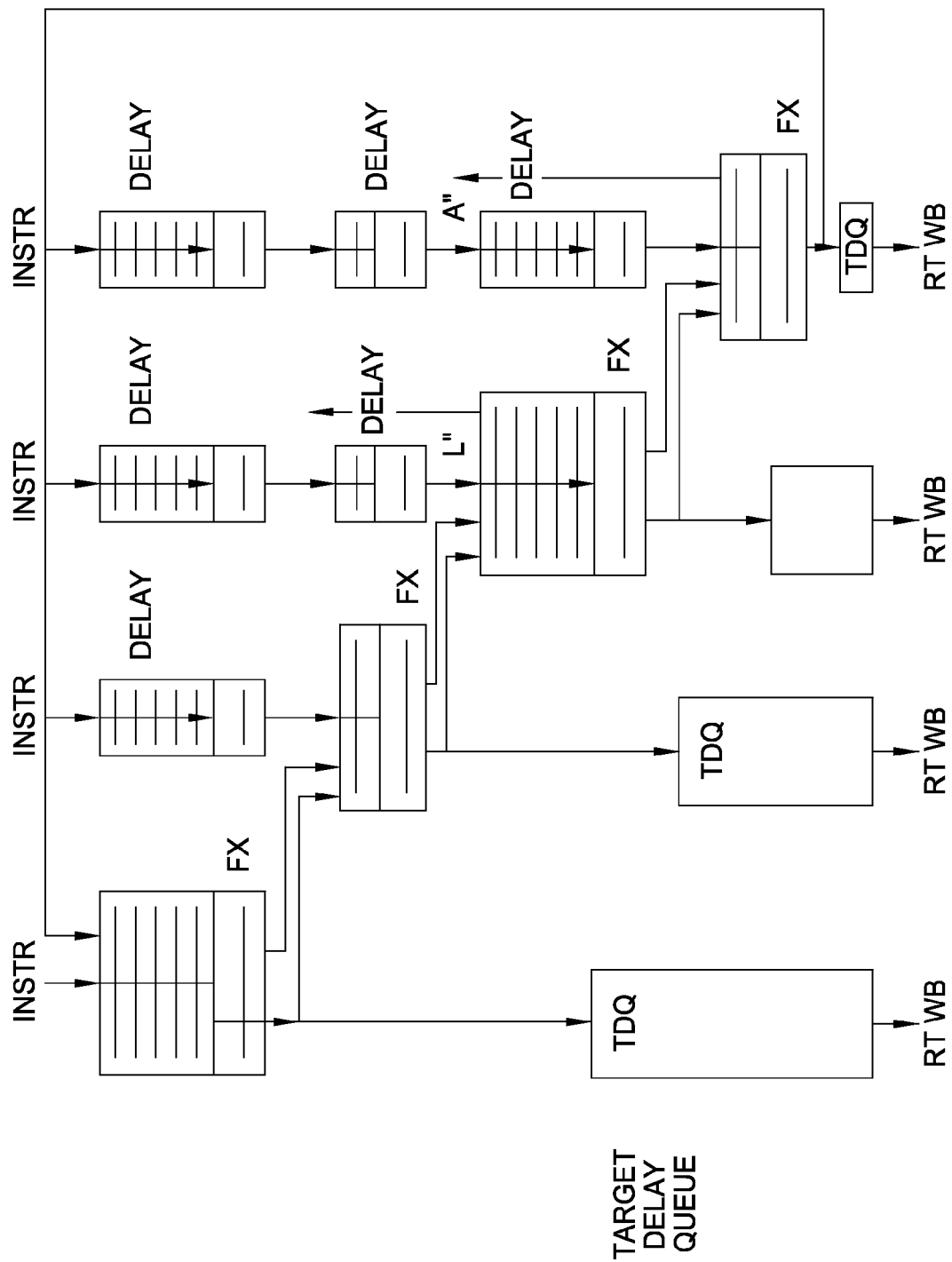
Figure 7D:
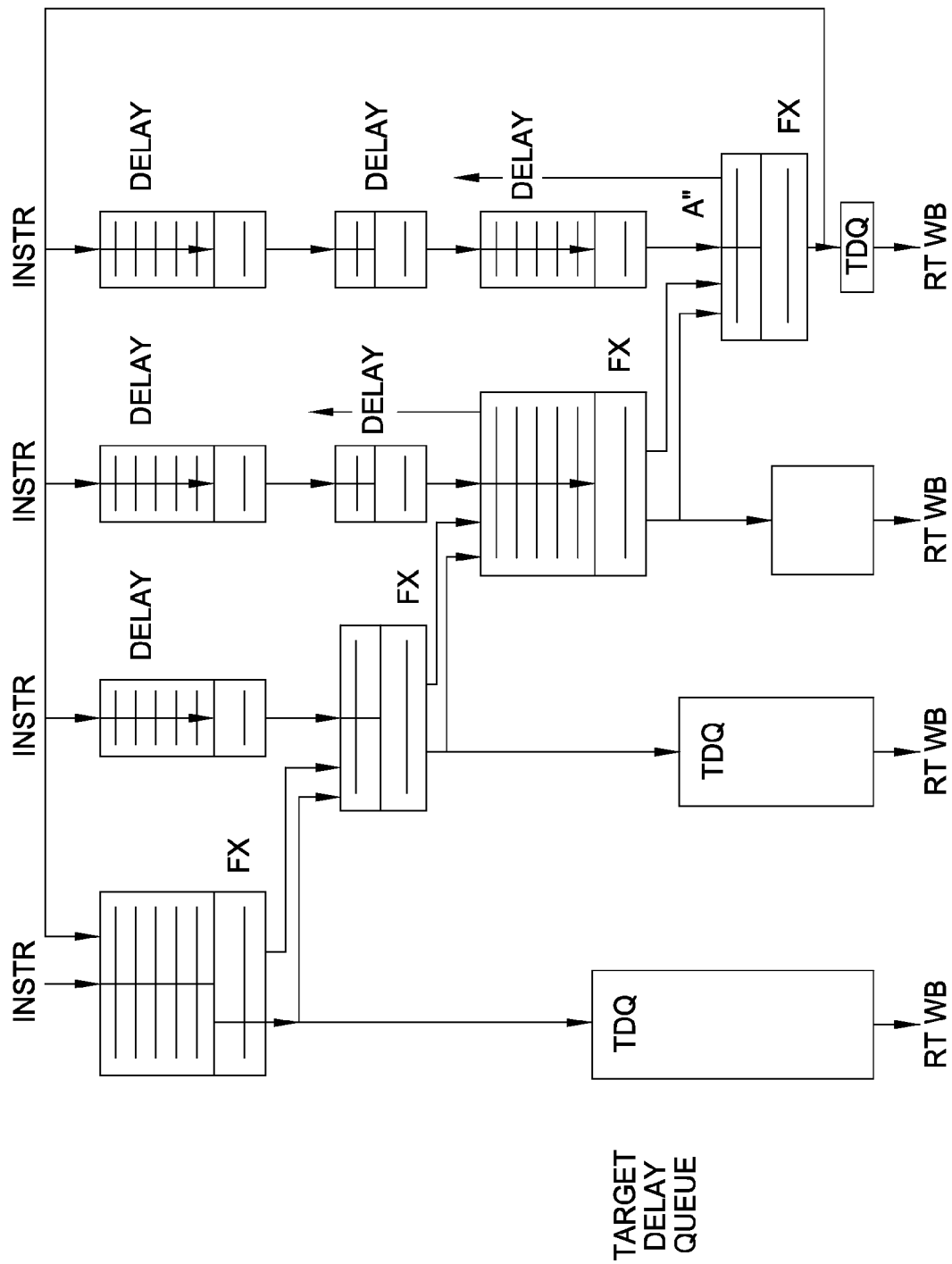

In any case, as illustrated in FIG. 7C, the results of executing the first add (A') may be available as the second load L" reaches the second LSU 612L of the third pipeline (P2). Finally, as illustrated in FIG. 7D, the results of executing the second load (L") may be available as the second add A" reaches the second ALU 612A of the fourth pipeline (P3). Results of executing instructions in the first group may be used as operands in executing the subsequent issue groups and may, therefore, be fed back (e.g., directly or via TDQs 630).

While not illustrated, it should be understood that each clock cycle a new issue groups may enter the pipeline unit 600. In some cases, for example, due to relatively rare instruction streams with multiple dependencies (L'-L"-L'''), each new issue group may not contain a maximum number of instructions (4 in this example), the cascaded delayed arrangement described herein may still provide significant improvements in throughput by allowing dependent instructions to be issued in a common issue group without stalls.

Example Embodiments of Floating Point/Vector Cascaded Delayed Execution Pipelines The concepts of cascaded, delayed, execution pipeline units presented herein, wherein the execution of one more instructions in an issue group is delayed relative to the execution of another instruction in the same group, may be applied in a variety of different configurations utilizing a variety of different types of functional units. Further, for some embodiments, multiple different configurations of cascaded, delayed, execution pipeline units may be included in the same system and/or on the same chip. The particular configuration or set of configurations included with a particular device or system may depend on the intended use.

The fixed point execution pipeline units described above allow issue groups containing relatively simple operations that take only a few cycles to complete, such as load, store, and basic ALU operations to be executed without stalls, despite dependencies within the issue group. However, it is also common to have at least some pipeline units that perform relatively complex operations that may take several cycles, such as floating point multiply/add (MADD) instructions, vector dot products, vector cross products, and the like.

In graphics code, such as that often seen in commercial video games, there tends to be a high frequency of scalar floating point code, for example, when processing 3D scene data to generate pixel values to create a realistic screen image. An example of an instruction stream may include a load (L), immediately followed by a first multiply/add (MADD) based on the load as an input, followed by a second MADD based on the results of the first MADD. In other words, the first MADD depends on the load, while the second MADD depends on the first MADD. The second MADD may be followed by a store to store the results generated by the second MADD.

Figure 8:
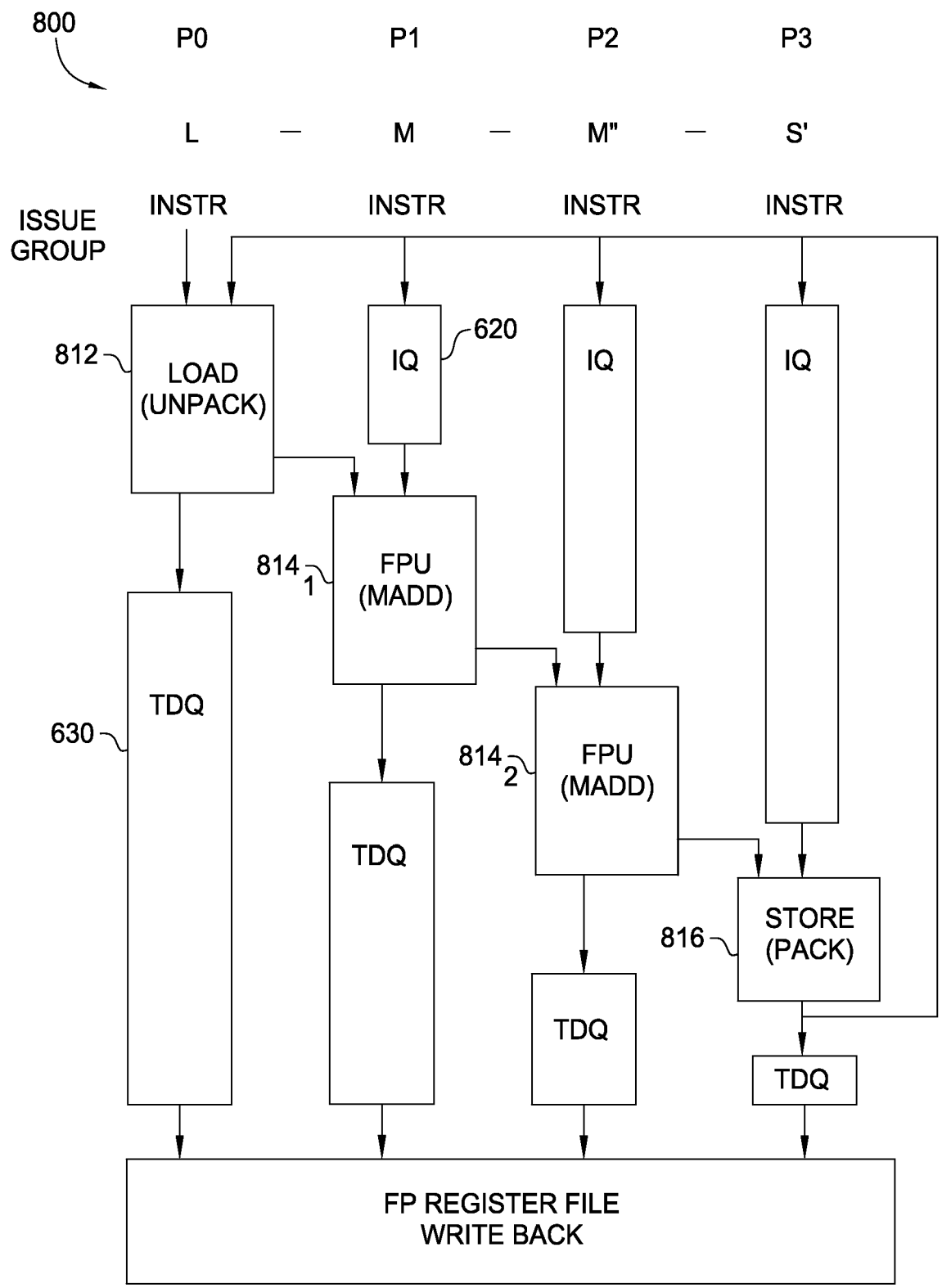
FIG. 8 illustrates an exemplary floating point cascaded delayed execution pipeline unit in accordance with embodiments of the present invention.

FIG. 8 illustrates a cascaded, delayed, execution pipeline unit 800 that would accommodate the example instruction stream described above, allowing the simultaneous issue of two dependent MADD instructions in a single issue group. As illustrated, the unit has four execution units, including a first load store unit (LSU) 812, two floating point units FPUs $814_1$ and $814_2$, and a second LSU 816. The unit 800 allows direct forwarding of the results of the load in the first pipeline (P0) to the first FPU $814_1$ in the second pipeline (P1) and direct forwarding of the results of the first MADD to the second FPU $814_1$.

FIGS. 9A-9D illustrate the flow of an exemplary issue group of four instructions (L'-M'-M"-S') through the pipeline unit 800 shown in FIG. 8 (with M' representing a first dependent multiply/add and M" representing a second multiply/add dependent on the results of the first). As illustrated, in FIG. 9A, the issue group may enter the unit 900, with the load instruction (L') scheduled to the least delayed first pipeline (P0). As a result, L' will reach the first LSU 812 to be executed before the other instructions in the group (these other instructions may make there way down through instruction queues 620) as L' is being executed.

Figure 9A:
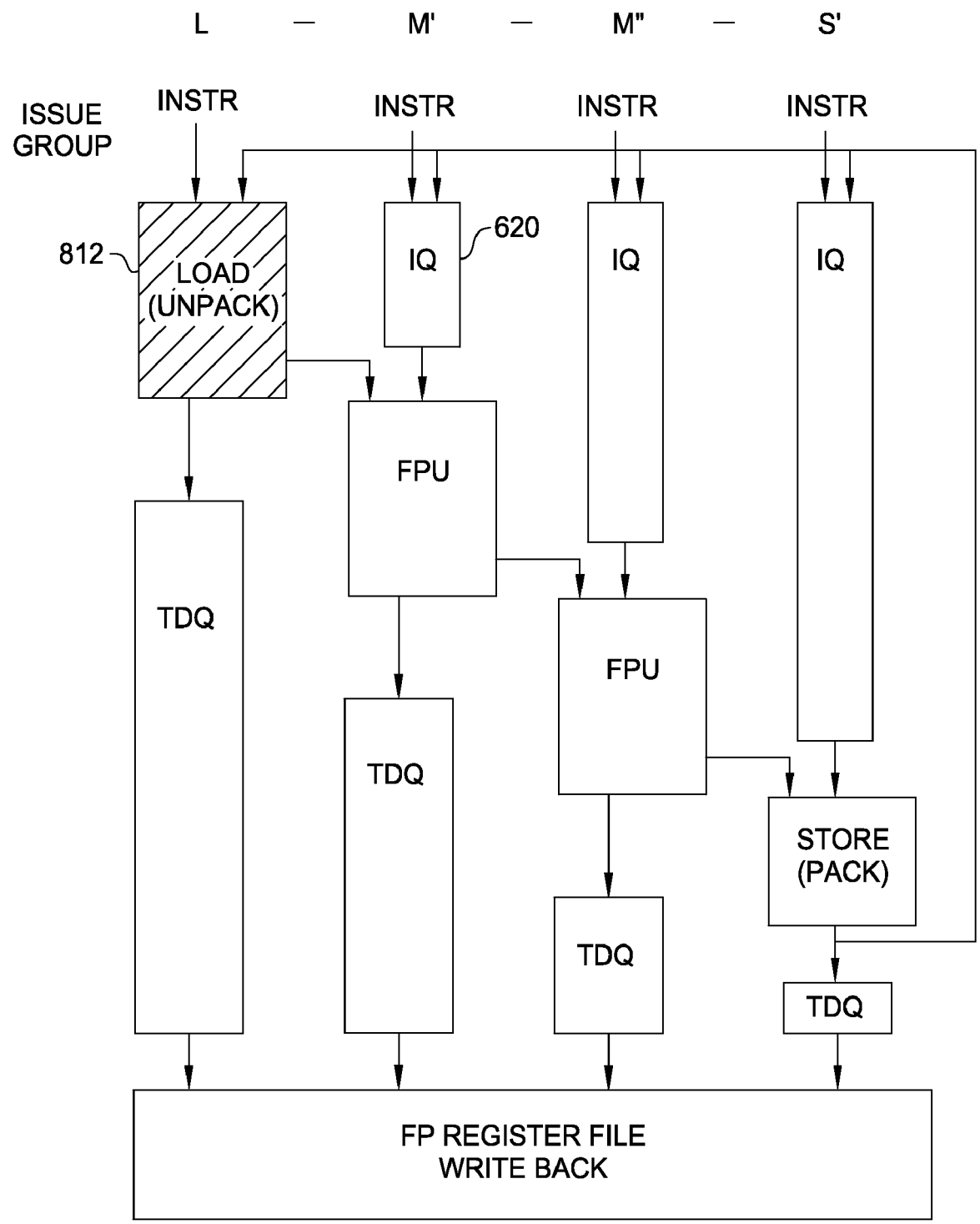
FIGS. 9A-9D illustrate the flow of instructions through the pipeline unit shown in FIG. 5.
Figure 9B:
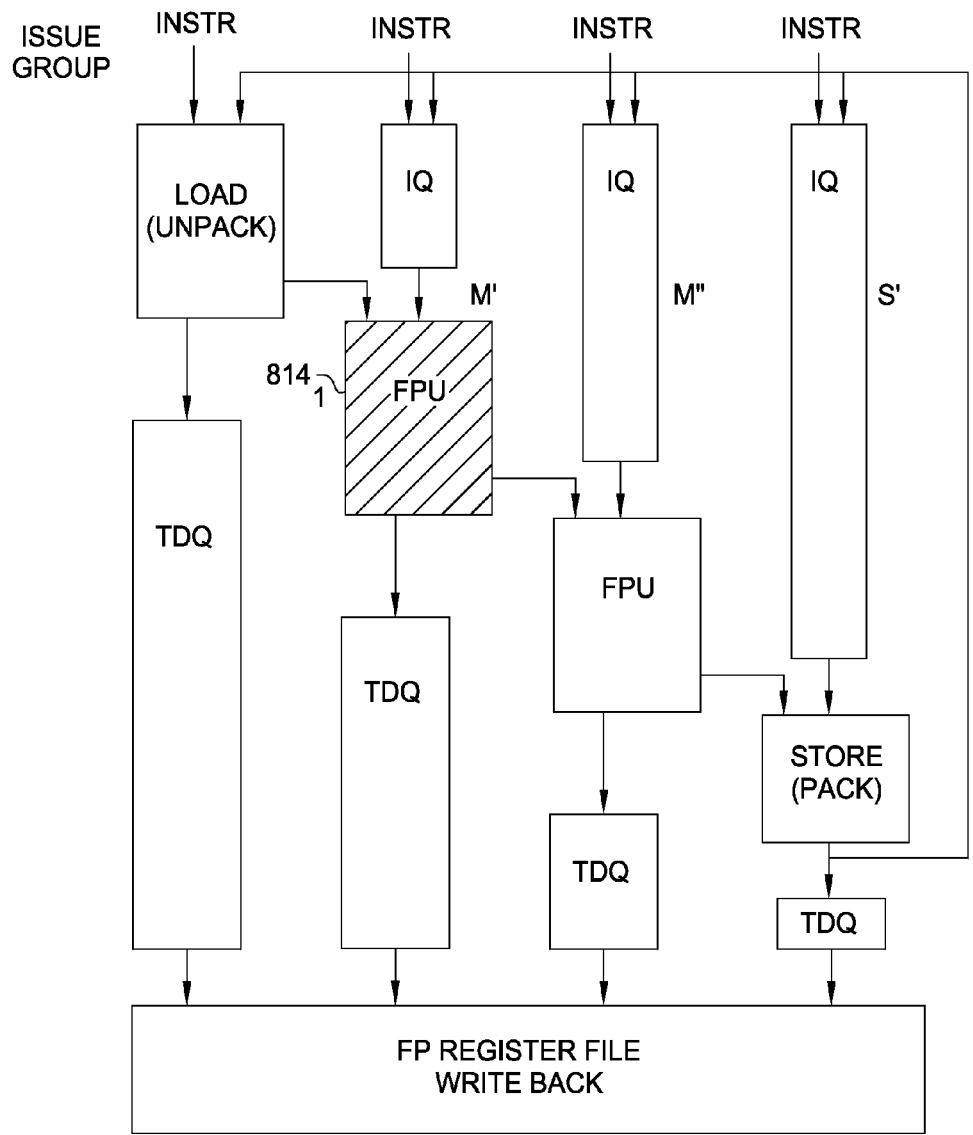
Figure 9C:
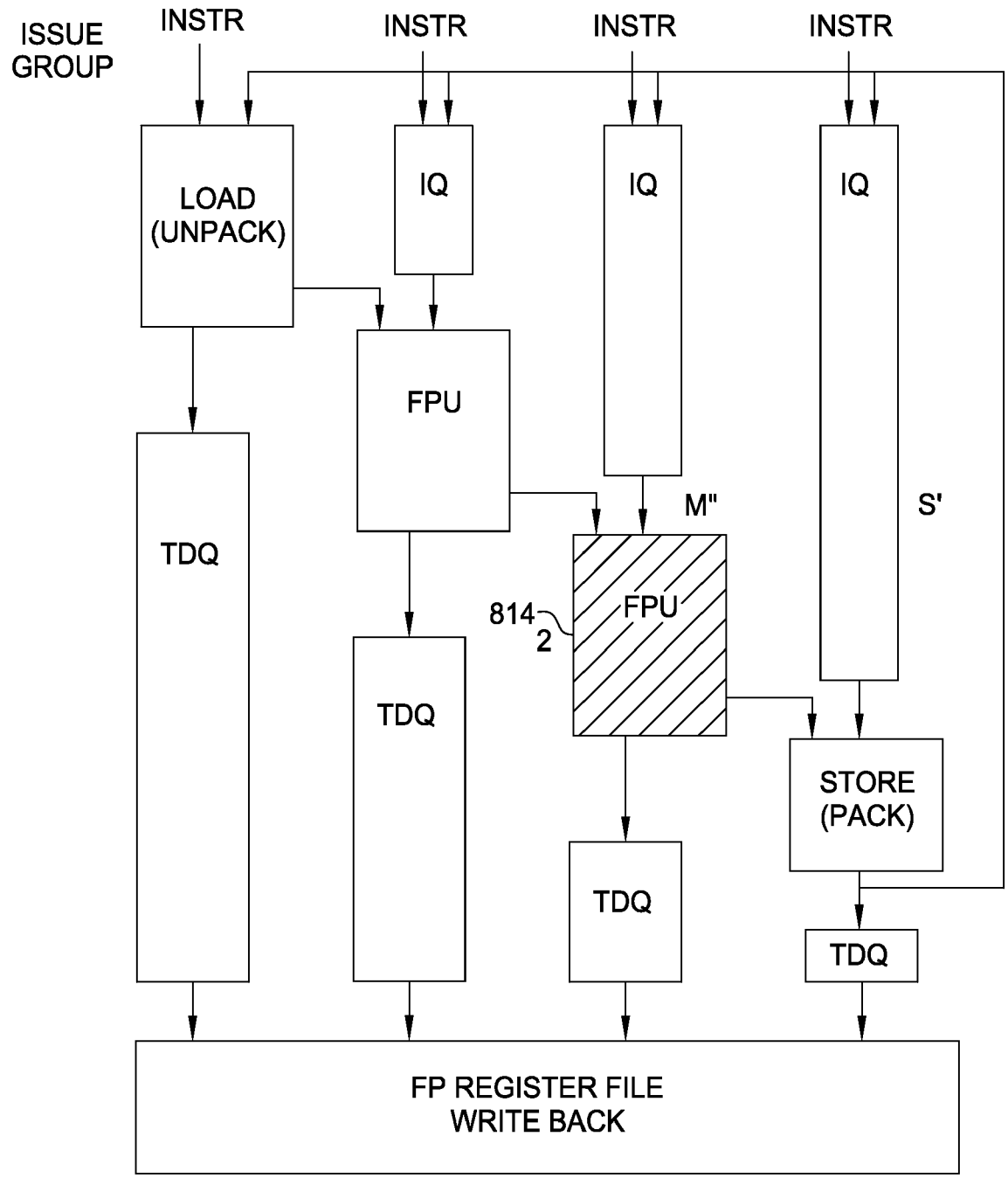
Figure 9D:
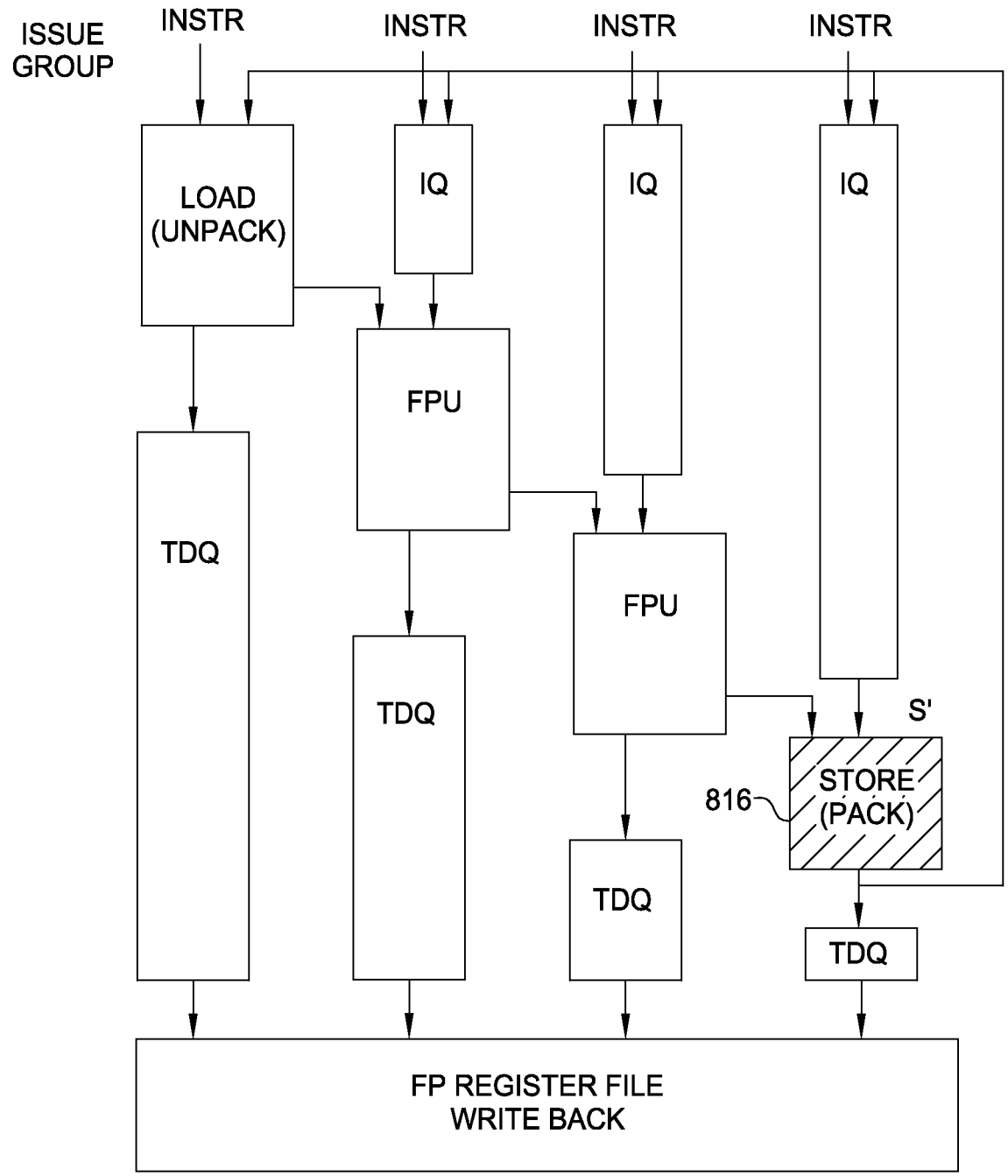

As illustrated in FIG. 9B, the results of executing the first load (L') may be forwarded to the first FPU $814_1$ as the first MADD instruction (M') arrives. As illustrated in FIG. 9C, the results of executing the first MADD (M') may be available just as the second MADD (M") reaches the second FPU $814_2$ of the third pipeline (P2). Finally, as illustrated in FIG. 9D, the results of executing the second MADD (M") may be available as the store instruction (S') reaches the second LSU 812 of the fourth pipeline (P3).

Results of executing instructions in the first group may be used as operands in executing the subsequent issue groups and may, therefore, be fed back (e.g., directly or via TDQs 630), or forwarded to register file write back circuitry. For some embodiments, the (floating point) results of the second MADD instruction may be further processed prior to storage in memory, for example, to compact or compress the results for more efficient storage.

When comparing the floating point cascaded, delayed, execution pipeline unit 800 shown in FIG. 8 with the integer cascaded, delayed, execution pipeline unit 600 shown in FIG. 6, a number of similarities and differences may be observed. For example, each may utilize a number of instruction queues 620 to delay execution of certain instructions issued to "delayed" pipelines, as well as target delay queues 630 to hold "intermediate" target results.

The depth of the FPUs 814 of unit 800 may be significantly greater than the ALUs 600 of unit 600, thereby increasing overall pipeline depth of the unit 800. For some embodiments, this increase in depth may allow some latency, for example, when accessing the L2 cache, to be hidden. As an example, for some embodiments, an L2 access may be initiated early on in pipeline P2 to retrieve one of the operands for the second MADD instruction. The other operand generated by the first MADD instruction may become available just as the L2 access is complete, thus effectively hiding the L2 access latency.

In addition, the forwarding interconnects may be substantially different, in part due to the fact that a load instruction can produce a result that is usable (by another instruction) as an address, a floating point MADD instruction produces a floating point result, which can not be used as an address. Because the FPUs do not produce results that can be used as an address, the pipeline interconnect scheme shown in FIG. 8 may be substantially simpler.

Figure 10:
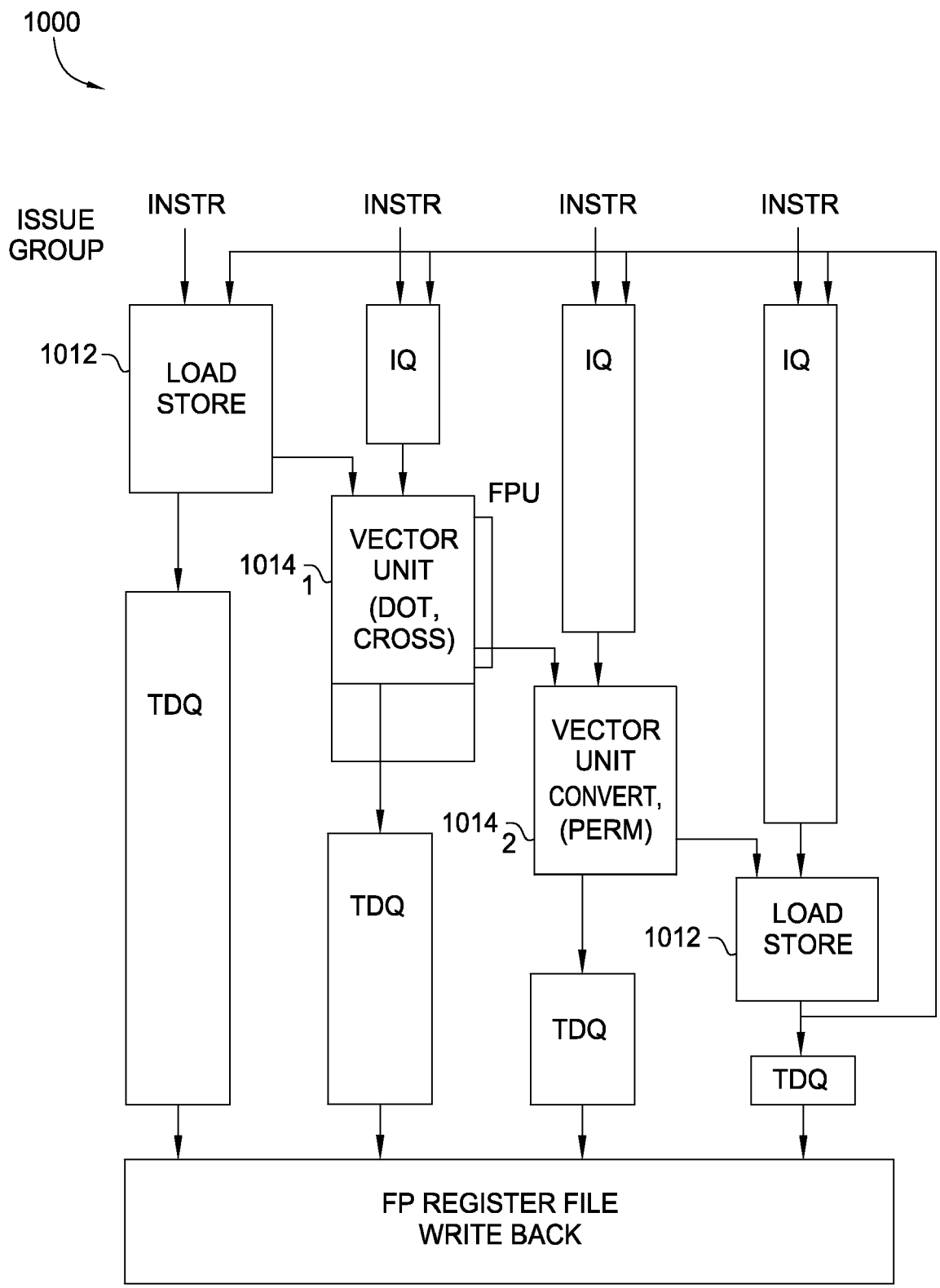
FIG. 10 illustrates an exemplary vector cascaded delayed execution pipeline unit in accordance with embodiments of the present invention.

For some embodiments, various other arrangements of pipeline units may be created for targeted purposes, such as vector processing with permutation instructions (e.g., where intermediate results are used as input to subsequent instructions). FIG. 10 illustrates a cascaded, delayed, execution pipeline unit 1000 that would accommodate such vector operations.

Similar to the execution unit 800 shown in FIG. 8, the execution unit 1000 has four execution units, including first and second load store units (LSUs) 1012, but with two vector processing units FPUs 1014$_1$ and 1014$_2$. The vector processing units may be configured to perform various vector processing operations and, in some cases, may perform similar operations (multiply and sum) to the FPUs 814 in FIG. 8, as well as additional functions.

Examples of such vector operations may involve multiple (e.g., 32-bit or higher) multiply/adds, with the results summed, such as in a dot product (or cross product). Once a dot product is generated, another dot product may be generated therefrom, and/or the result may be compacted in preparation for storage to memory. For some embodiments, a generated dot product may be converted from float to fix, scaled, and compressed, before it is stored to memory or sent elsewhere for additional processing. Such processing may be performed, for example, within a vector processing unit 1014, or in a LSU 1012.

Example Embodiments of Shared Instruction Predecoder Supporting Multiple Processor Cores As described above, different embodiments of the present invention may utilize multiple processor cores having cascaded, delayed execution pipelines. For some embodiments, at least some of the cores may utilize different arrangements of cascaded, delayed execution pipelines that provide different functionality. For example, for some embodiments, a single chip may incorporate one or more fixed point processor cores and one or more floating point and/or vector processing cores, such as those described above.

To improve processor performance and identify optimal issue groups of instructions that may be issued in parallel, instructions may be predecoded, for example, when lines of instructions (I-lines) are retrieved from L2 (or higher) cache. Such predecoding may include various functions, such as address generation, branch prediction, and scheduling (determining an order in which the instructions should be issued), which is captured as dispatch information (a set of flags) that control instruction execution.

In typical applications, these scheduling flags may rarely change after a relatively slow number of "training" execution cycles (e.g., 6-10 cycles). Typically, the flags that change the most will be branch prediction flags (flags that may indicate whether a) which may toggle around 3-4% of the time. As a result, there is a low requirement for re-translation/re-scheduling using the predecoder. An effect of this is that a predecoder dedicated to a single processor or processor core is likely to be underutilized in typical situations.

Figure 11:
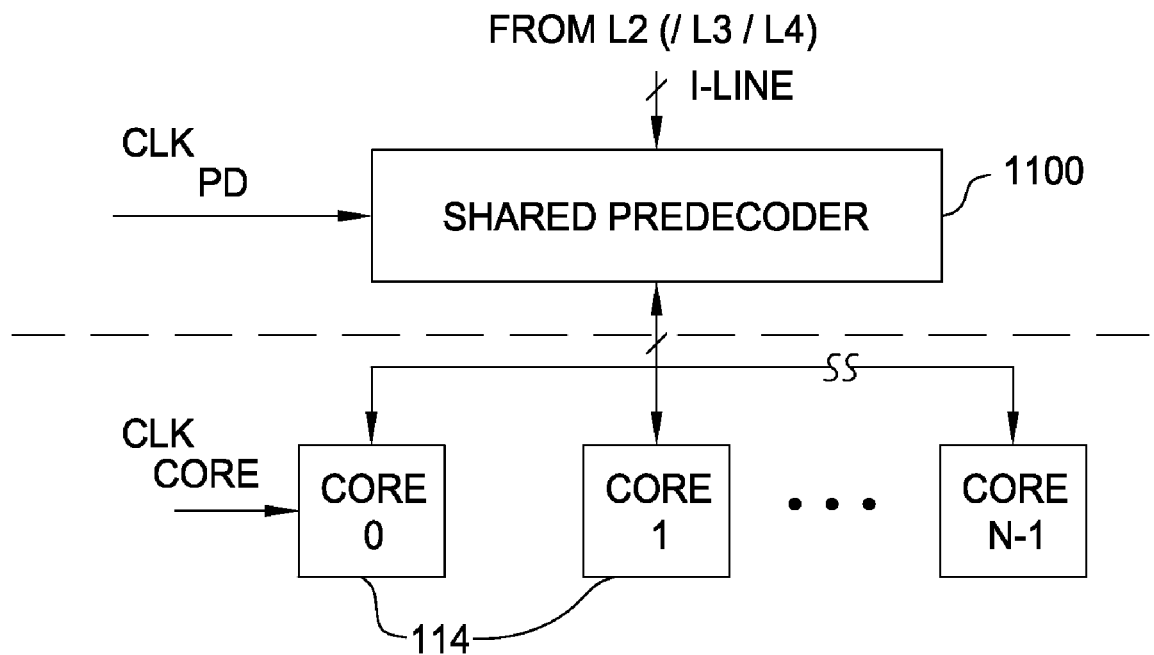
FIG. 11 illustrates an exemplary predecoder shared between multiple processor cores.

Because of the relatively light load placed on a predecoder by any given processor core coupled with the relatively infrequent need for retranslation of an I-cache line during steady state execution, a predecoder may be shared among multiple (N) processing cores (e.g., with N=4, 8, or 12). Such a shared predecoder 1100 is illustrated in FIG. 11, which is used to predecode I-lines to be dispatched to N processor cores 114 for execution. The N processor cores 114 may include any suitable combination of the same or different type processor cores which, for some embodiments, may include cascaded delayed arrangements of execution pipelines, as discussed above. In other words, the shared predecoder 1100 may be capable of predecoding any combination of fixed, floating point and/or vector instructions.

By sharing the predecoder 1100 between multiple cores, it may be made larger allowing for more complex logic predecoding and more intelligent scheduling, while still reducing the cost per processor core when compared to a single dedicated predecoder. Further, the real estate penalty incurred due to the additional complexity may also be relatively small. For example, while the overall size of a shared predecoder circuit may increase by a factor of 2, if it is shared between 4-8 processor cores, there is a net gain in real estate. For some embodiments, a single predecoder may be shared among of group of processor cores, for example, that share a common L2 cache and/or a higher level of cache.

With sufficient cycles available for predecoding due to the latency incurred when fetching I-lines from higher levels of cache and the ability to design greater complexity as a result of sharing, a near optimal schedule may be generated. For example, by recording, during the training cycles, execution activities, such as loads that resulted in cache misses and/or branch comparison results, groups of instructions suitable for parallel execution with few or no stalls may be generated.

In addition, for some embodiments, the shared predecoder 1100 may be run at a lower frequency ($CLK_{PD}$) than the frequency at which the processor cores are run ($CLK_{CORE}$) more complex predecoding may be allowed (more logic gate propagation delays may be tolerated) in the shared predecoder than in conventional (dedicated) predecoders operating at processor core frequencies. Further, additional "training" cycles that may be utilized for predecoding may be effectively hidden by the relatively large latency involved when accessing higher levels of cache or main memory (e.g., on the order of 100-1000 cycles). In other words, while 10-20 cycles may allow a fairly complex decode, schedule and dispatch, these cycles may be have a negligible effect on overall performance ("lost in the noise") when they are incurred when loading a program.

Figure 12:
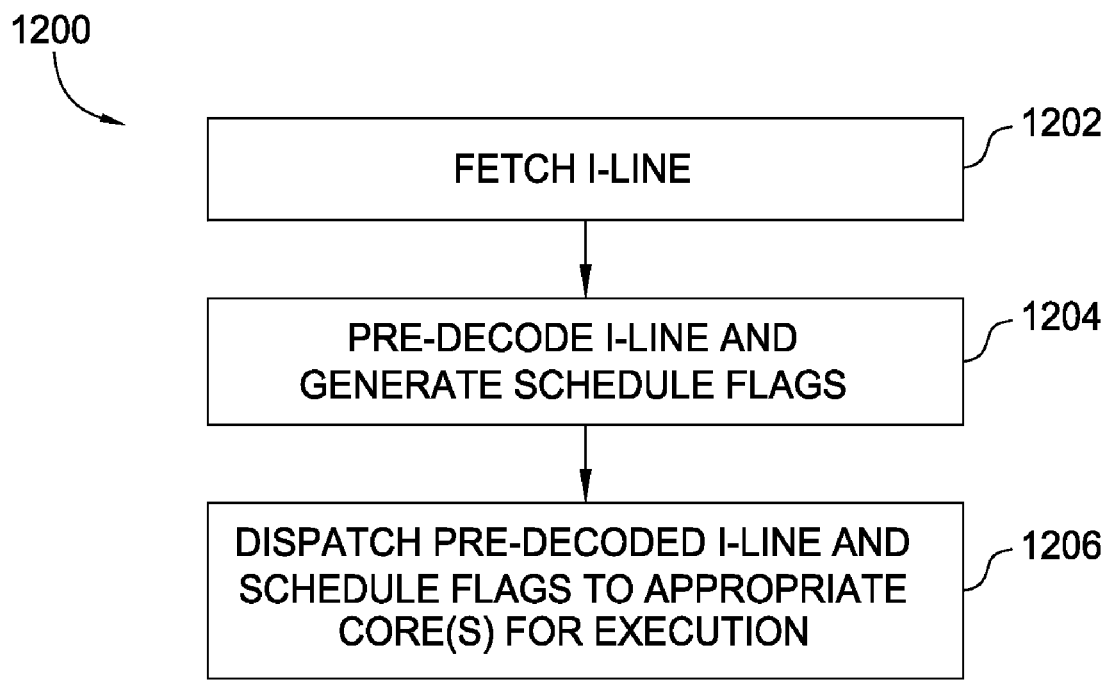
FIG. 12 exemplary operations that may be performed by the shared predecoder of FIG. 11.

FIG. 12 illustrates a flow diagram of exemplary operations 1200 that may be performed by the shared predecoder 1100. The operations begin, at step 1202, by fetching an I-line. For example, the I-line may be fetched when loading a program ("cold") into the L1 cache of any particular processor core 114 from any other higher level of cache (L2, L3, or L4) or main memory.

At step 1204, the I-line may be pre-decoded and a set of schedule flags generated. For example, predecoding operations may include comparison of target and source operands to detect dependencies between instructions and operations (simulated execution) to predict branch paths. For some embodiments, it may be necessary to fetch one or more additional I-lines (e.g., containing preceding instructions) for scheduling purposes. For example, for dependency comparisons or branch prediction comparisons it may be necessary to examine the effect of earlier instructions in a targeted core pipeline. Rules based on available resources may also be enforced, for example, to limit the number of instructions issue to a particular core based on the particular pipeline units in that core.

Based on the results of these operations, schedule flags may be set to indicate what groups of instructions are (e.g., utilizing stop bits to delineate issue groups). If the predecoder identifies a group of (e.g., four) instructions that can be executed in parallel, it may delineate that group with a stop bit from a previous group (and four instructions later) and another stop bit.

At step 1206, the predecoded I-line and schedule flags are dispatched to the appropriate core (or cores) for execution. As will be described in greater detail below, for some embodiments, schedule flags may be encoded and appended to or stored with the corresponding I-lines. In any case, the schedule flags may control execution of the instructions in the I-line at the targeted core. For example, in addition to identifying an issue group of instructions to be issued in parallel, the flags may also indicate to which pipelines within an execution core particular instructions in the group should be scheduled (e.g., scheduling a dependent instruction in a more delayed pipeline than the instruction on which it depends).

Figure 13:
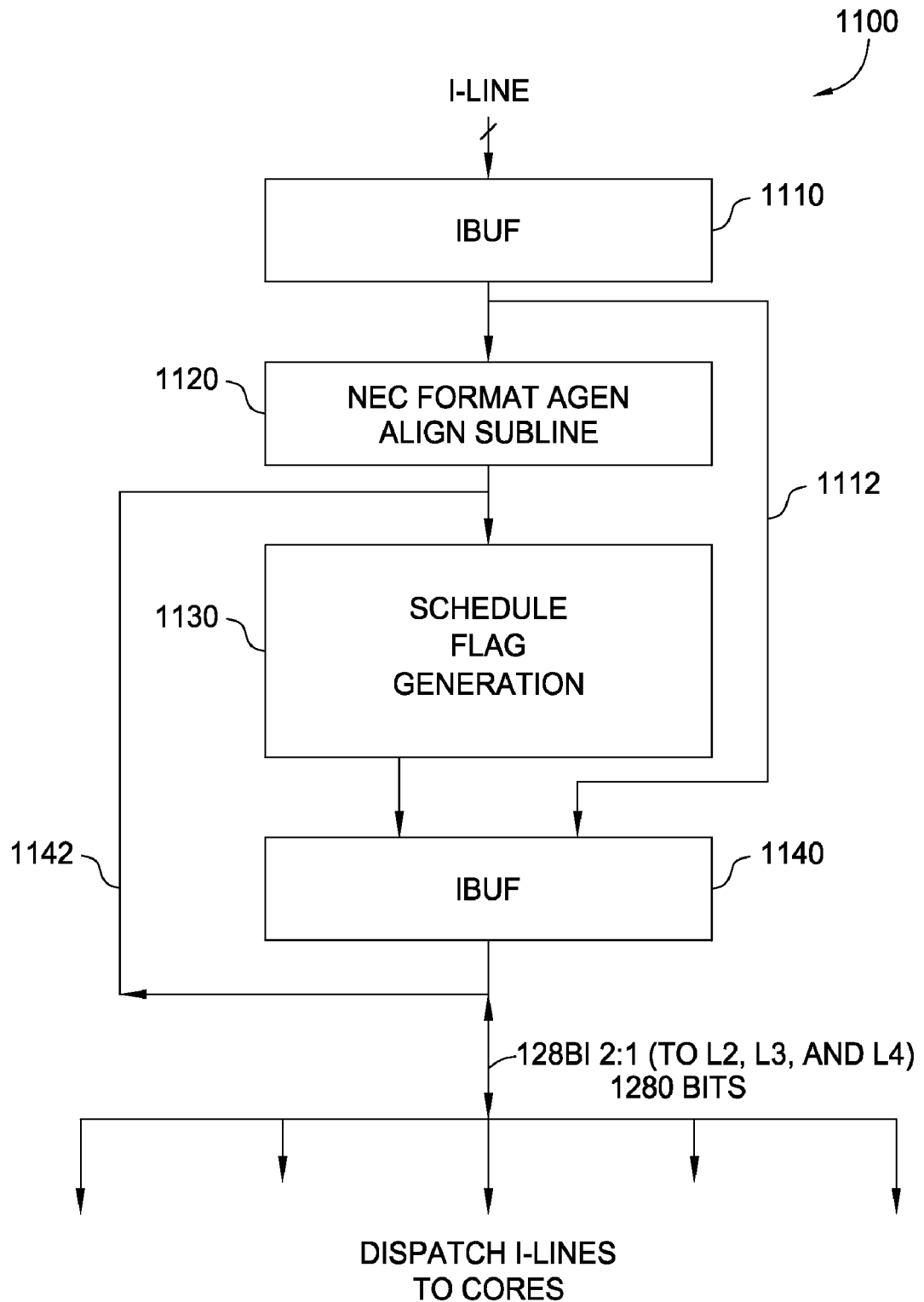
FIG. 13 illustrates an exemplary shared predecoder.

FIG. 13 illustrates one embodiment of the shared predecoder 1100 in greater detail. As illustrated, I-lines may be fetched and stored in an I-line buffer 1110. I-lines from the buffer 1110 may be passed to formatting logic 1130, for example, to parse full I-lines (e.g., 32 instructions) into sub-lines (e.g., 4 sub-lines with 8 instructions each), rotate, and align the instructions. Sub-lines may then be sent to schedule flag generation logic 1130 with suitable logic to examine the instructions (e.g., looking at source and target operands) and generate schedule flags that define issue groups and execution order. Predecoded I-lines may then be stored in a pre-decoded I-line buffer 1140 along with the generated schedule flags, from where they may be dispatched to their appropriate targeted core. The results of execution may be recorded, and schedule flags fed back to the flag generation logic 1130, for example, via a feedback bus 1142.

As will be described in greater detail below, for some embodiments, pre-decoded I-lines (along with there schedule flags) may be stored at multiple levels of cache (e.g., L2, L3 and/or L4). In such embodiments, when fetching an I-line, it may only be necessary to incur the additional latency of schedule flag generation 1130 when fetching an I-line due an I cache miss or if a schedule flag has changed. When fetching an I-line that has already been decoded and whose schedule flags have not changed, however, the flag generation logic 1130 may be bypassed, for example, via a bypass bus 1112.

As described above, sharing a predecoder and scheduler between multiple cores may allow for more complex predecoding logic resulting in more optimized scheduling. This additional complexity may result in the need to perform partial decoding operations in a pipelined manner over multiple clock cycles, even if the predecode pipeline is run at a slower clock frequency than cores.

Figure 14:
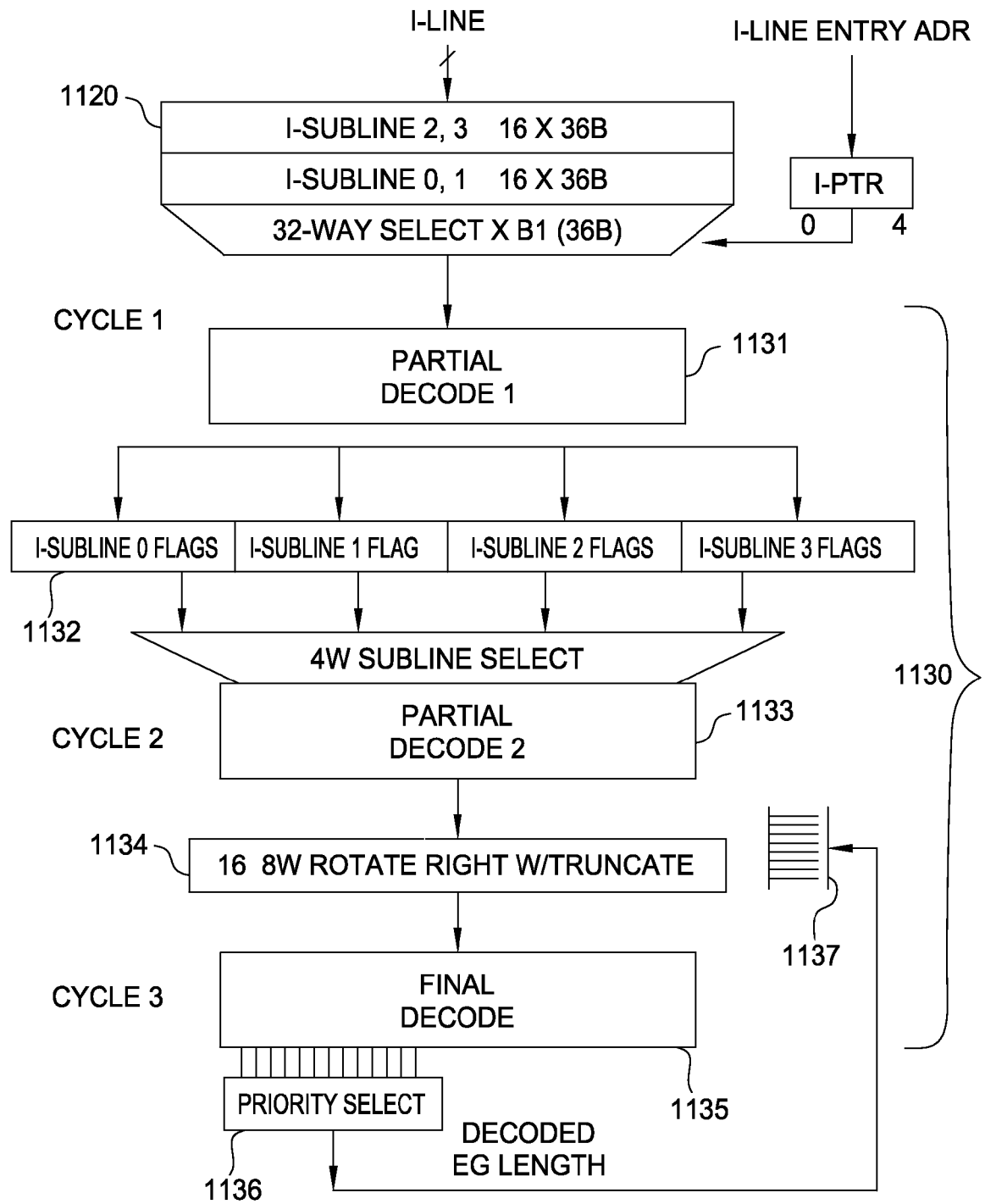
FIG. 14 illustrates an exemplary shared predecoder pipeline arrangement.

FIG. 14 illustrates one embodiment of a predecode pipeline, with partial decoding operations of schedule flag generation logic 1130 occurring at different stages. As illustrated, a first partial decoder 1131 may perform a first set of predecode operations (e.g., resource value rule enforcement, and/or some preliminary reformatting) on a first set of sub-lines in a first clock cycle, and pass the partially decoded sub-lines to a buffer 1132. Partially decoded sub-lines may be further pre-decoded (e.g., with initial load store dependency checks, address generation, and/or load conflict checks) by a second partial decoder in a second clock cycle, with these further decoded sub-lines passed on to alignment logic 1134. Final pre-decode logic 1135 may still further decode the sub-lines (e.g., with final dependency checks on formed issue groups and/or issue group lengths determined) in a third clock cycle. Issue group lengths may be stored in a table 1137 and used to set stop flags delineating issue groups.

As an example of predecode operations, in one or more of the predecode cycles, a dependency check may be done to sum up dependencies identified by a number (e.g., more than 100) register compares to determine which instructions are valid and to group them. Grouping may be done different ways (e.g., based on load-load dependencies and/or add-add dependencies). Instructions may be grouped based on whether they should be scheduled to a more delayed or less delayed pipe line. A decision may then be made to group (e.g., four or five) instructions based on available pipe lines and which rank (corresponding depth of pipeline stage) of a target dependency queue has dependencies.

For example, a first instruction that is a load may be scheduled to a non-delayed pipeline, while another load dependent on the results of the first load may be scheduled to a delayed pipeline so the results will be available by the time it executes. In the case that a set of instructions cannot be scheduled on any pipe line without a stall, an issue group may be ended after the first instruction. In addition, a stall bit may be set to indicate not only that the instructions can not be scheduled in a common issue group, but, since it stalled, the group could be ended immediately after. This stall bit may facilitate future predecoding.

Persistent Storage of Predecoded I-Lines

As previously described, I-line schedule flags generated during a pre-decoding training phase of multiple cycles, may change relatively infrequently after training. For example, after training, during steady state execution of a program, the schedule flags may change only a few percent of the time. For some embodiments, this observation may be exploited and, after spending the training cycles up front to generate the schedule and dispatch information for a I-line, this predecode/schedule information may be stored in higher levels of cache (e.g., in L2, L3 and/or L4 caches). As a result, when fetching the I-line during a later execution cycle, pre-decoding (re-translation) for scheduling purposes may not be necessary.

Figure 15:
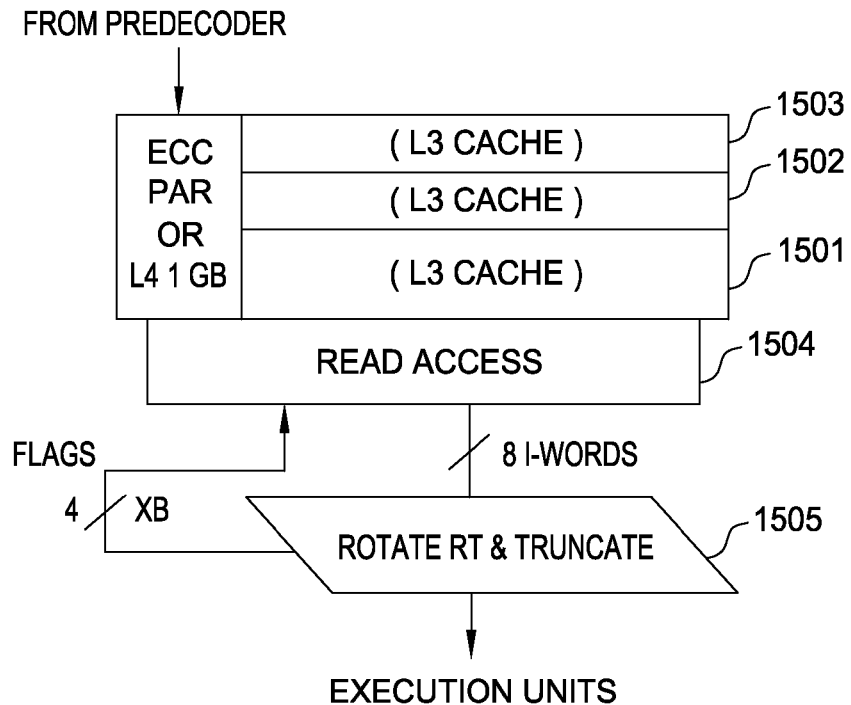
FIG. 15 illustrates predecoded instruction lines shared at multiple cache levels.

FIG. 15 illustrates conceptually the concept of storing pre-decoded I-lines persistently in multiple levels of cache. Illustratively, predecoded I-lines and schedule flags ("I-flags") are stored in all levels of cache. However, for some embodiments of the invention, only specified levels of cache and/or memory may contain the information (e.g., data access histories and data target addresses) contained in the I-line.

For some embodiments, I-flags may be encoded in pre-decoded I-lines. therefore, formatting logic 1505 may be provided to format the I-lines, for example, to rotate and truncate instructions, where necessary in preparation for dispatch to processor cores. As illustrated, for some embodiments, a set of flags may be extracted and fed back to read access circuitry 1504. For example, such flags may indicate one or more I-lines or data lines that should be prefetched from L2 cache 1502 or L3 cache 1503, based on previous execution history, as described in commonly owned U.S. patent application Ser. No. 11/347,414, entitled, "SELF PREFETCHING L2 CACHE MECHANISM FOR DATA LINES, filed Feb. 3, 2006 and Ser. No. 11/347,412, entitled, "SELF PREFETCHING L2 CACHE MECHANISM FOR INSTRUCTION LINES, filed Feb. 3, 2006, incorporated herein by reference in their entirety.

Figure 16:
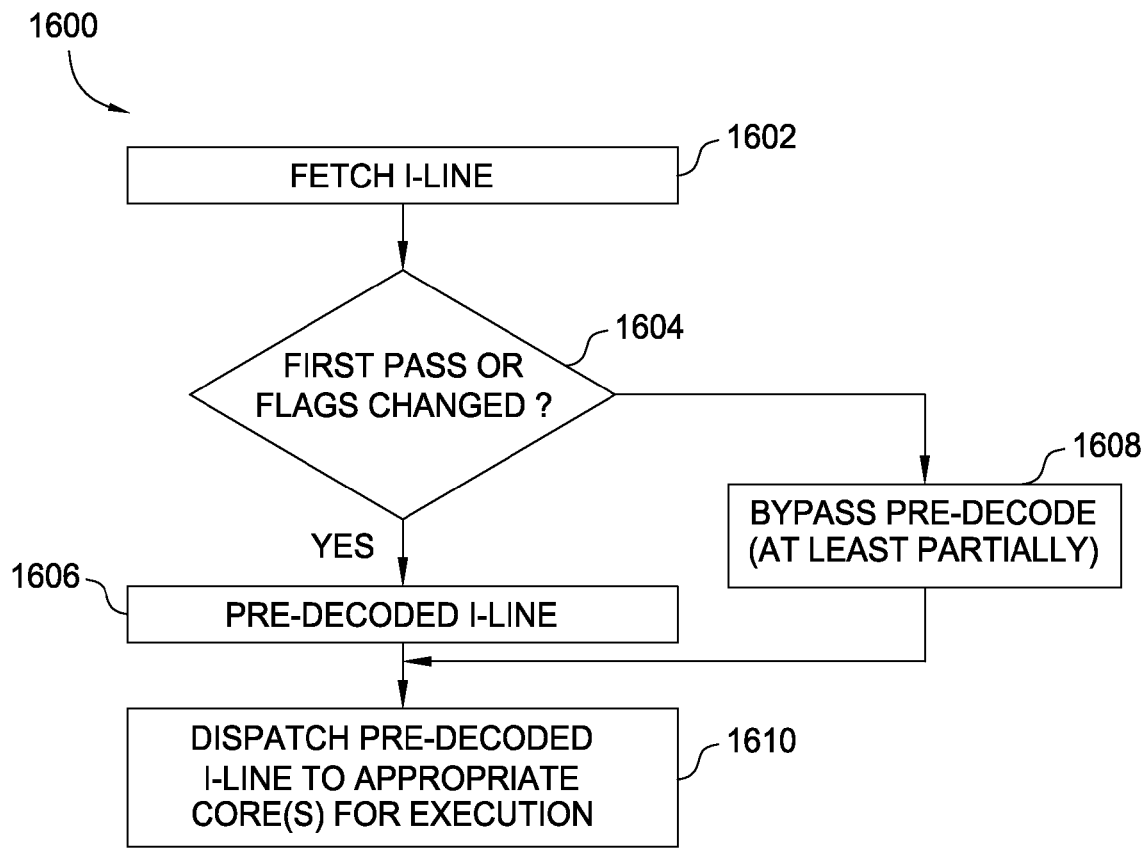
FIG. 16 illustrates exemplary operations for processing previously predecoded instruction lines.

FIG. 16 illustrates operations for dispatching I-lines, where predecoded information is stored persistently, in accordance with embodiments of the present invention. The operations begin, at step 1602, by fetching an I-line. If the fetch resulted in an I-cache miss (the requested I-line is not in the L1 cache) or the schedule flags have changed as a result of execution (e.g., a branch history flag is changed indicating a different path has been taken than previously), the I-line may be pre-decoded, at step 1606. Otherwise, if the fetch hit (the requested I-line was already in the L1 cache) and the schedule flags have not changed, pre-decode may be bypassed, at least partially (e.g., some formatting may still be performed). At step 1610, the pre-decoded (or re-predecoded) I-line is dispatched for execution.

In general, cache coherency principles, known to those skilled in the art, may be used to update copies of the I-line in each level of cache and/or memory if store-through caching is employed in all caches. Further, since only instruction flags are modified (and treated as hints only) normal store-in caching (updating the cache line in the I-cache and mark that I-line as changed, causing that changed I-line, when replaced, will result in the changed line being written out to the L2 cache) also works as the instructions themselves are not modified and are still read-only. The case of an I-line with stale (out of date) I-flags still results in correct execution in all cases, albeit some loss of performance may be incurred. It is noted that in traditional systems which utilize instruction caches, instructions are typically not modified. Thus, in traditional systems, I-lines are typically aged out of the L1 cache 1501 after some time instead of being written back to the L2 cache 1502. However, to maintain pre-decoded information persistently, when I-flags are modified during execution, the I-lines (I-flags) may be modified and, when replaced, these modified I-lines may be cast out to higher levels of cache (e.g., the L2 and/or L3 cache), thereby allowing pre-decode information (I-flags) to be maintained.

It may be noted that stored/generated schedule flags may be regarded as "hints" and that the only "up to date" version will be in the corresponding L1 I-line cache. For some embodiments, once an I-line is done, it may be cast out with no other processor able to access that I-line. As a result, it is not necessary to maintain coherency (to ensure multiple processors access the same version of the I-line). Because the flags are used as hints only, proper execution may still be achieved even if the hint is wrong and/or the latest version of the I-line is accessed by another processor core.

Figure 17:
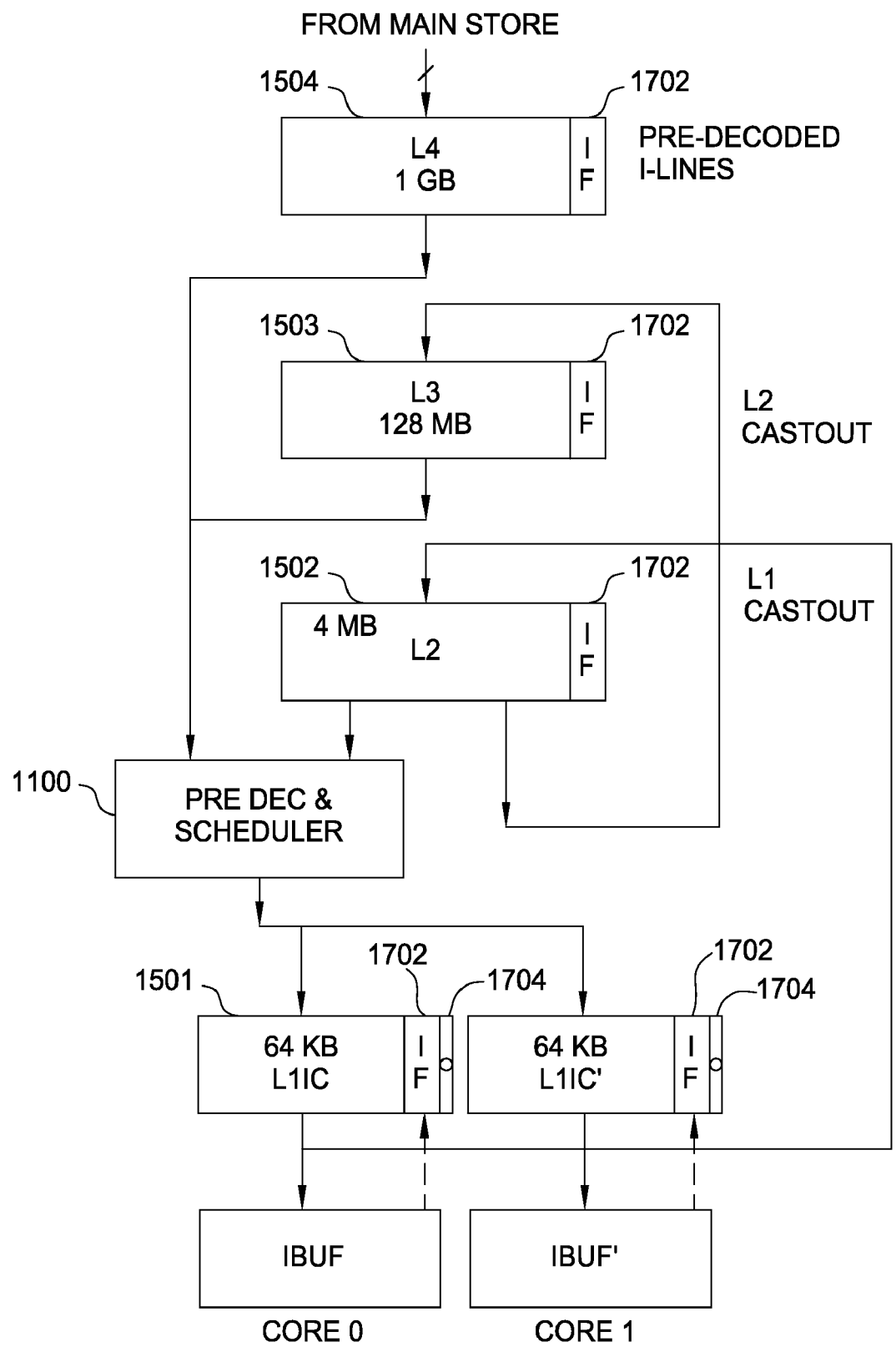
FIG. 17 illustrates a cache hierarchy for storing predecoded instruction lines at multiple cache levels.

As an example, referring to FIG. 17, when instructions in an I-line have been processed by the processor core (possible causing the data target address and other history information to be updated), the I-flags 1702 in an I-line may be modified in the L1 cache. A change flag 1704 may be marked to indicate the change in I-flags. As illustrated, when the I-lines are replaced in the L1, because they are marked as changed, they may be cast out to the L2. In a similar manner, modified I-lines may be cast out from the L2 to L3.

Storing pre-decoded I-lines with scheduling information (I-flags) in this manner may be referred to as "semi-permanent" scheduling. In other words, the scheduling information may be generated initially, for example, at a cold start when loading a program. Only if the schedule flags change (e.g., the branch pattern changes during training or execution) is re-predecoding necessary. As a result, system performance may be improved by avoiding unnecessary re-predecoding cycles and I-lines may be dispatched immediately. In addition, overall system power consumption may be reduced by avoiding the predecoding operations (e.g., several hundred dependency checks).

CONCLUSION

By providing a "cascade" of execution pipelines that are delayed relative to each other, a set of dependent instructions in an issue group may be intelligently scheduled to execute in different delayed pipelines such that the entire issue group can execute without stalls.

While the foregoing is directed to embodiments of the present invention, other and further embodiments of the invention may be devised without departing from the basic scope thereof, and the scope thereof is determined by the claims that follow.

What is claimed is:

1. A method of predecoding instructions for execution in a multi-core processor, comprising:

receiving a first line of complete instructions for execution by a first processor core of the multi-core processor, wherein the first processor core comprises a cascaded delayed execution pipeline unit having at least first and second execution pipelines, wherein instructions in a common issue group issued to the cascaded delayed execution pipeline unit begin execution in the first execution pipeline before the second execution pipeline, and wherein at least the first execution pipeline comprises circuitry for forwarding results of a first instruction from a first issue group to an execution unit in one of the first pipeline and the second pipeline, wherein the execution unit is executing a second instruction from a second issue group;

predecoding the first line of complete instructions with a shared predecoder;

sending the predecoded first line of complete instructions from the shared predecoder to the first processor core for execution in the cascaded delayed execution pipeline;

receiving a second line of complete instructions for execution by a second processor core of the multi-core processor;

predecoding the second line of complete instructions with the shared predecoder;

sending the predecoded second line of complete instructions from the shared predecoder to the second processor core for execution;
receiving a third line of instructions for execution by a third processor core;
determining whether to predecode the third line of instructions, based on whether an instruction cache miss has occurred for the third line of instructions and whether at least one schedule flag associated with the third line of instructions has changed;
upon determining to predecode the third line of instructions:
  predecoding the third line of instructions with the shared predecoder; and
  sending the predecoded third line of instructions from the shared predecoder to the third processor core for execution; and
upon determining not to predecode the third line of instructions:
  sending the predecoded third line of instructions from the shared predecoder to the third processor core for execution without predecoding.

2. The method of claim 1, wherein the first line of complete instructions comprises fixed point instructions and the second line of complete instructions comprises floating point instructions.

3. The method of claim 1, further comprising:
operating the shared predecoder at a first clock frequency; and
operating at least one of the first and second processor cores at a second clock frequency at least twice the first clock frequency.

4. The method of claim 1, wherein the first issue group of instructions to be issued is defined by setting stop bits.

5. The method of claim 1, further comprising:
storing first and second predecoded lines of complete instructions in multiple levels of cache.

6. The method of claim 1, wherein a capacity of the shared predecoder for performing predecoding operations of additional complexity is increased by:
operating the shared predecoder at a first clock frequency; and
operating at least one of the first and second processor cores at a second clock frequency greater than the first clock frequency, thereby increasing a capacity of the multi-core processor for accommodating logic gate propagation delays associated with predecoding by the shared predecoder.

7. The method of claim 1, wherein the predecoder is shared between the first processor core, the second processor core, and the third processor core of the multi-core processor, such as to increase utilization of the predecoder when schedule flags associated with lines of instructions for the multi-core processor change infrequently.

8. The method of claim 1, wherein the schedule flag comprises a branch prediction flag.

9. The method of claim 1, wherein a first instruction of the common issue group is fetched in a different cycle than a second instruction of the common issue group.

10. The method of claim 1, wherein predecoding the first line of complete instructions comprises defining the first issue group of instructions to be issued in a single cycle to the cascaded delayed execution pipeline unit of the first processor core of the multi-core processor for execution without stalling by virtue of the first issue group having at least one instruction dependency.

11. An integrated circuit device comprising:
a plurality of processor cores, wherein at least one of the processor cores comprises:
  a cascaded delayed execution pipeline unit having at least first and second execution pipelines, wherein instructions in a common issue group issued to the cascaded delayed execution pipeline unit begin execution in the first execution pipeline before the second execution pipeline and at least one of the first and second execution pipelines operates on a floating point operand, and wherein at least the first execution pipeline comprises circuitry for forwarding results of a first instruction from a first issue group to an execution unit in one of the first pipeline and the second pipeline, wherein the execution unit is executing a second instruction from a second issue group; and
  a forwarding path for forwarding results generated by executing a first instruction in the first execution pipeline to the second execution pipeline for use in executing a second instruction; and
a shared predecoder configured to:
  fetch instructions lines, each instruction line comprising a plurality of instructions;
  predecode the instruction lines;
  send the predecoded instruction lines to the processor cores for execution;
  receive a subsequent line of instructions for execution by one of the processor cores;
  determine whether to predecode the subsequent line of instructions, based on whether an instruction cache miss has occurred for the subsequent line of instructions and whether at least one schedule flag associated with the subsequent line of instructions has changed;
  upon determining to predecode the subsequent line of instructions:
    predecode the subsequent line of instructions; and
    send the predecoded subsequent line of instructions to the one of the processor cores for execution; and
  upon determining not to predecode the subsequent line of instructions:
    send the subsequent line of instructions to the one of the processor cores for execution without predecoding.

12. The device of claim 11, wherein at least one of the processor cores executes instructions that perform a dot product operation.

13. The device of claim 11, wherein:
the processor cores operate at a first clock frequency; and
the shared predecoder operates at a second clock frequency different from the first clock frequency.

14. An integrated circuit device comprising:
a plurality of cascaded delayed execution pipeline units, each having at least first and second execution pipelines, wherein instructions in a common issue group issued to the cascaded delayed execution pipeline unit begin execution in the first execution pipeline before the second execution pipeline and a forwarding path for forwarding results generated by executing a first instruction in the first execution pipeline to the second execution pipeline for use in executing a second instruction, wherein at least one of the first and second execution pipelines operates on a floating point operand, and wherein the first instruction is part of a first issue group and the second instruction is part of a second issue group; and shared predecoding and scheduling circuitry configured to:
receive lines of instructions to be executed by the pipeline units;
predecode the instruction lines to form issue groups whereby first and second instructions in each group are scheduled for execution in the first and second execution pipelines of one of the cascaded delayed execution pipeline units;
receive a subsequent line of instructions for execution by one of the execution pipelines;
determine whether to predecode the subsequent line of instructions, based on whether an instruction cache miss has occurred for the subsequent line of instructions and whether at least one schedule flag associated with the subsequent line of instructions has changed;
upon determining to predecode the subsequent line of instructions:
predecode the subsequent line of instructions; and
send the predecoded subsequent line of instructions to the one of the execution pipelines for execution; and
upon determining not to predecode the subsequent line of instructions:
send the subsequent line of instructions to the one of the execution pipelines for execution without predecoding.

15. The device of claim 14, wherein the shared predecoding and scheduling circuitry determines if the second instruction is dependent on the first instruction by examining source and target operands of the first and second instructions.

16. The device of claim 14, wherein results of executing the first instruction are available at or before the second instruction reaches an execution unit of the second execution pipeline.

17. The device of claim 14, wherein at least one of the cascaded delayed execution pipeline units operates on instructions involving vector operations.

18. The device of claim 14, wherein the
the cascaded delayed execution pipeline units operate at a first clock frequency; and
the shared predecode and scheduling circuitry operates at a second clock frequency different from the first clock frequency.

19. The device of claim 14, wherein the device further comprises:
multiple levels of cache; and
cache control circuitry configured to store predecoded instruction lines in the multiple levels of cache.

20. The device of claim 19, wherein:
the multiple levels of cache comprise at least L2 and L3 levels of cache; and
the cache control circuitry is configured to store predecoded instruction lines in the L2 and L3 levels of cache.

* * * * *